United States Patent
Wan et al.

(10) Patent No.: US 11,573,829 B2
(45) Date of Patent: Feb. 7, 2023

(54) TASK PROCESSING METHOD AND APPARATUS, TERMINAL, AND COMPUTER READABLE STORAGE MEDIUM

(71) Applicant: Huawei Technologies Co., Ltd., Shenzhen (CN)

(72) Inventors: Chengzhen Wan, Hangzhou (CN); Gang Li, Hangzhou (CN); Guangzhu Zeng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 17/128,729

(22) Filed: Dec. 21, 2020

(65) Prior Publication Data
US 2021/0109788 A1    Apr. 15, 2021

Related U.S. Application Data

(63) Continuation of application No. PCT/CN2020/083330, filed on Apr. 3, 2020.

(30) Foreign Application Priority Data

Apr. 11, 2019 (CN) .......................... 201910291330.3

(51) Int. Cl.
*G06F 9/50* (2006.01)
*G06F 9/38* (2018.01)
*G06F 9/48* (2006.01)

(52) U.S. Cl.
CPC .......... *G06F 9/5022* (2013.01); *G06F 9/3836* (2013.01); *G06F 9/4881* (2013.01); *G06F 9/5016* (2013.01)

(58) Field of Classification Search
None
See application file for complete search history.

(56) References Cited

U.S. PATENT DOCUMENTS

| 7,062,557 | B1 * | 6/2006 | Bhatti | G06F 16/958 707/E17.116 |
| 2005/0204054 | A1 * | 9/2005 | Wang | G06F 9/5011 709/232 |
| 2010/0265827 | A1 | 10/2010 | Horn et al. | |

(Continued)

FOREIGN PATENT DOCUMENTS

| CN | 102396260 A | 3/2012 |
| CN | 104684029 A | 6/2015 |

(Continued)

OTHER PUBLICATIONS

Sun Microsystems, Inc., "Multithreaded Programming Guide," 2550 Carcla Avenue, Mountain View, California 94043-1100 U.S.A, Aug. 1994, XP000949166, 188 pages.

(Continued)

*Primary Examiner* — Eric Coleman
(74) *Attorney, Agent, or Firm* — Conley Rose, P.C.

(57) ABSTRACT

A task processing method includes setting, by a terminal, a quality of service (QoS) class of a task, where the QoS class is related to user perception, and configuring a priority of a thread executing the task as the QoS class of the task, where the priority of the thread indicates an execution sequence of the thread in the system.

20 Claims, 13 Drawing Sheets

(56) References Cited

U.S. PATENT DOCUMENTS

| | | | |
|---|---|---|---|
| 2014/0344824 A1* | 11/2014 | Brock | G06F 9/485 |
| | | | 718/103 |
| 2014/0351820 A1* | 11/2014 | Lee | G06F 9/4881 |
| | | | 718/103 |
| 2014/0359632 A1* | 12/2014 | Kishan | G06F 9/4881 |
| | | | 718/103 |
| 2015/0347189 A1* | 12/2015 | Steffen | G06F 9/4893 |
| | | | 718/103 |
| 2016/0191344 A1 | 6/2016 | Bartfai-Walcott et al. | |
| 2017/0269967 A1 | 9/2017 | Steffen et al. | |
| 2019/0132222 A1* | 5/2019 | Son | H04L 41/5009 |

FOREIGN PATENT DOCUMENTS

| | | |
|---|---|---|
| CN | 105307277 A | 2/2016 |
| CN | 105700939 A | 6/2016 |
| CN | 107635256 A | 1/2018 |
| CN | 109144682 A | 1/2019 |
| CN | 109308212 A | 2/2019 |

OTHER PUBLICATIONS

Bastoni, A., et al., "9th annual workshop on Operating Systems Platforms for Embedded Real-Time Applications Editors: Contents", 25th Euromicro Conference on Real-Time Systems Paris, Jul. 9, 2013, XP055200474, 60 pages.

\* cited by examiner

TASK PROCESSING METHOD AND APPARATUS, TERMINAL, AND COMPUTER READABLE STORAGE MEDIUM

CROSS-REFERENCE TO RELATED APPLICATIONS

This application is a continuation of International Patent Application No. PCT/CN2020/083330 filed on Apr. 3, 2020, which claims priority to Chinese Patent Application No. 201910291330.3 filed on Apr. 11, 2019. The disclosures of the aforementioned applications are hereby incorporated by reference in their entireties.

TECHNICAL FIELD

This application relates to the field of computer technologies, and in particular, to a task processing method and apparatus, a terminal, and a computer readable storage medium.

BACKGROUND

A terminal device is widely applied to people's daily life. However, as use time increases, a freezing phenomenon occurs when the terminal device executes a task. For example, it takes relatively long time for the terminal device to start an application program, and content of the application program can be displayed on a display interface of the terminal device only after the application is started. Freezing occurs when the display interface is waiting for the application program to start. A reason why the application program is started slowly is that when the terminal device processes an application program start task, a process of the application program needs to queue for a long time before being processed. The terminal device may allocate a priority to an application program in a system, and process, based on the priority, a task related to each application, to avoid a freezing case caused when the terminal device processes the task.

A task processing may be the following process. The system of the terminal device includes a plurality of application programs, where an application program displayed on the display interface of the terminal device may be referred to as a foreground application program, and an application program that is not displayed on the display interface may be referred to as a background application program, and the terminal device allocates a priority to each application program based on whether the application program can be displayed on the display interface, where a priority of the foreground application program is relatively high, and a priority of the background application program is relatively low. When processing tasks of the foreground application program and the background application program, the terminal device may generate a process related to each application program, and the terminal device completes, by processing the process, a task related to the application program, where a priority of a process related to the foreground application program is relatively high, and a priority of a process related to the background application program is relatively low. For example, when processing a task, the terminal device calls a plurality of threads to implement the task. An operating system (for example, LINUX) kernel of the terminal device schedules the plurality of threads at a scheduling layer using a Completely Fair Scheduler (CFS). In a scheduling process, a LINUX kernel may perform scheduling based on a thread priority. Virtual execution time indicated by a virtual clock is used as a reference. A virtual clock of a thread with a high priority goes relatively slowly, and a virtual clock of a process with a low priority goes relatively fast. Although virtual execution time of the thread with the high priority and virtual execution time of the thread with the low priority are relatively fair, the execution time of the process with the low priority is shorter than the execution time of the process with the high priority. When processing of all threads required by the task is completed, processing of the task is completed. However, when one or more threads whose priorities do not match a requirement of the task exist in the plurality of threads, excessively long execution time of the task is easily caused. For example, threads of one or more background applications exist in the plurality of threads, and the threads of the one or more background applications have relatively long execution time due to a relatively low priority. Consequently, total time consumed by the task is relatively long, and system freezing is perceived from a perspective of a user, thereby reducing user experience.

SUMMARY

Embodiments of this application provide a task processing method and apparatus, a terminal, a computer readable storage medium, and the like such that a freezing problem can be avoided to some extent, and user experience of a terminal device can be improved. This application is described below from different aspects. It should be understood that implementations and beneficial effects of the following aspects may refer to each other.

According to a first aspect, this application provides a task processing method, and the method includes receiving a task request, where the task request is used to indicate to process a task related to an application program, obtaining a quality of service (QoS) class of the task based on the task request, when a subtask corresponding to the task request is processed using a first thread, configuring a QoS class of the first thread as the QoS class of the task, and processing, based on a processing sequence corresponding to the QoS class (or a priority) of the first thread, a subtask corresponding to the first thread.

The foregoing "thread" may also be a "process". The task is a service provided by a terminal for a user using the application program. The task may be a start task, or may be any task in a running process of the application program, for example, a slip task. The start task may be a task of starting the application program by the terminal, and the slip task may be a task of switching the application program on a display interface by the terminal. Certainly, the task may be alternatively another task. Specific content of the task is not limited in this embodiment of this application.

In the foregoing manner, a QoS class of the task request is newly added, and is related to user perception. A QoS class of a task request with strong user perception is higher than a QoS class of a task request with weak user perception. The QoS class may be set based on experience, or may be set in a machine learning manner.

The "subtask" herein may be understood differently based on different tasks. If the task cannot be split or does not need to be split for execution, the subtask may be understood as the task. If the task requires that a plurality of processes or a plurality of threads be implemented in parallel or in serial in a specific sequence, to be specific, the task is decomposed into different processes or threads, tasks separately executed by the plurality of processes or threads may be understood as "subtasks" of the task. A specific manner of splitting the task is not limited in this application.

The task request may carry a task identifier and an object identifier of the task. The object identifier is used to indicate an object of the task, the object may be any application program in the terminal, and the object identifier may be a name of the object. For example, if the task request carries a start identifier start and an object identifier ABC, the task request is used to indicate to start an application program whose name is ABC.

Based on the foregoing possible implementation, when the subtask corresponding to the task request is processed using the first thread, the QoS class of the first thread is configured as the QoS class of the task, and the subtask corresponding to the first thread is processed based on the processing sequence corresponding to the QoS class of the first thread such that in a process of processing the task, the priority of the used first thread is the same as the QoS class of the task, instead of merely using an original priority. In this way, a processing sequence when the first thread is processed may comply with the QoS class of the task, and for a task with a high QoS class (for example, a user-sensitive interface drawing task), the thread is executed faster such that the task is implemented faster, and user experience is better. For example, the first thread may be a thread of a background application, and if the thread is executed based on a priority of the background application, waiting time is relatively long, and relatively long execution time of the task is caused. However, because the QoS class of the task is relatively high, a priority of the first thread may be increased based on the QoS class of the task, thereby reducing the waiting time and improving task processing efficiency.

In a possible implementation, processing, based on a processing sequence corresponding to the QoS class of the first thread, a subtask corresponding to the first thread includes, before inserting the subtask into a subtask that is in a processing queue and whose QoS class is lower than the QoS class of the first thread or that has no QoS class, processing the subtask based on a sequence in the processing queue.

The processing queue is used to store a subtask of each thread. Based on the foregoing possible implementation, a subtask of a thread with a relatively high QoS class may cut in line in the processing queue such that the terminal can preferentially process the subtask of the thread with the relatively high QoS class, and therefore the task with the relatively high service class can be preferentially processed.

In a possible implementation, processing a subtask corresponding to the first thread includes configuring a QoS class of a second thread as the QoS class of the first thread when a target resource of the subtask is locked, where the second thread is a thread that locks the target resource, and processing the subtask based on the target resource when the second thread releases a lock on the target resource.

In a possible implementation, configuring a QoS class of a second thread as the QoS class of the first thread when a target resource of the subtask is locked includes locking the target resource during execution of the subtask corresponding to the first thread, determining the second thread when the target resource fails to be locked, and when the QoS class of the second thread is lower than the QoS class of the first thread, updating the QoS class of the second thread to the QoS class of the first thread.

The target resource is any resource that can be locked in a system, for example, a memory control block and a binder node. The lock added by the first thread to the target resource may include any type of lock such as a mutex, a read/write semaphore, or a JAVA lock. Certainly, the lock may be alternatively another lock. For example, when the first thread needs a memory resource, the terminal may lock the memory control block using the read/write semaphore such that the first thread can use a memory resource corresponding to the memory control block. For another example, when the first thread calls another thread using a binder driver, the terminal may lock the binder node using the mutex such that the first thread can call a thread corresponding to the binder node. The lock on the target resource is not limited in this embodiment of this application.

In a possible implementation, processing the subtask based on the target resource when the second thread releases a lock on the target resource includes, after the second thread releases the lock on the target resource, locking the target resource based on a sequence in a waiting queue of the target resource, and restoring the original QoS class of the second thread, where the waiting queue of the target resource is used to store a thread to be used for processing the target resource, and processing the subtask based on the target resource after the target resource is locked.

Based on the foregoing possible implementation, when the QoS class of the first thread is relatively low, the QoS class of the second thread is updated to the QoS class of the first thread such that the QoS class of the first thread is consistent with the QoS class of the second thread. In this case, when the second thread releases the lock, the first thread may lock and process the target resource based on the sequence in the waiting queue of the target resource. This avoids priority inversion.

In a possible implementation, the method further includes adjusting, when the first thread calls a third thread, the QoS class of the first thread and a QoS class of the third thread based on an amount of data that is of the first thread and that is cached in the third thread.

In a possible implementation, adjusting, when the first thread calls a third thread, the QoS class of the first thread and a QoS class of the third thread based on an amount of data that is of the first thread and that is cached in the third thread includes keeping the QoS class of the first thread and the QoS class of the third thread unchanged if the amount of data that is of the first thread and that is cached in the third thread is less than a data amount threshold when the first thread calls the third thread, and lowering the QoS class of the first thread if the amount of data that is of the first thread and that is cached in the third thread is greater than or equal to the data amount threshold when the first thread calls the third thread.

Based on the foregoing possible implementation, a QoS class of a thread executed by the terminal when processing the task request is dynamically adjusted such that the terminal can execute the first thread at a most appropriate speed. This avoids unnecessary power consumption caused when the first thread uses a resource in the system, or a case in which the resource is insufficient for a lower-layer thread to use.

In a possible implementation, adjusting, when the first thread calls a third thread, the QoS class of the first thread and a QoS class of the third thread based on an amount of data that is of the first thread and that is cached in the third thread includes improving the QoS class of the first thread if the amount of data that is of the first thread and that is cached in the third thread is less than a data amount threshold when the first thread calls the third thread, and improving the QoS class of the third thread if the amount of data that is of the first thread and that is cached in the third thread is greater than or equal to the data amount threshold when the first thread calls the third thread.

Based on the foregoing possible implementation, when the amount of data that is of the first thread and that is cached in the third thread is less than the data amount threshold, the terminal improves the QoS class of the first thread such that the amount of data that is of the first thread and that is in the third thread reaches the data amount threshold, and when the third thread is suddenly consumed excessively fast, a case in which the amount of data that is of the first thread and that is in the third thread cannot keep up with consumption progress can be avoided. When the amount of data that is of the first thread and that is cached in the third thread is greater than or equal to the data amount threshold, the terminal improves the QoS class of the third thread such that a consumption speed of the amount of data that is of the first thread and that is cached in the third thread is accelerated, and data generated by the first thread can be prevented from being accumulated in the third thread.

In a possible implementation, the QoS class of the task is determined by a task feature of the task.

Based on the foregoing possible implementation, when the QoS class of the first thread is configured based on the QoS class of the task, the QoS class of the first thread may be related to the QoS class of the task.

In a possible implementation, the method further includes, when the task is being processed, if the application program is switched from foreground running to background running, configuring a QoS class of the thread corresponding to the task as a first target class.

Based on the foregoing possible implementation, a QoS class of an application program running in background and a QoS class of the thread corresponding to the task are configured as the first target class such that the terminal does not preferentially process a task of the application program running in the background, thereby reducing interference caused by the application program running in the background to an application program running in foreground.

In a possible implementation, configuring the QoS class of the first thread as the QoS class of the task includes configuring a QoS class field in a thread control block structure of the first thread as the QoS class of the task, where the thread control block structure is used to store thread information.

In a possible implementation, the method further includes, when the first thread fails to apply for a memory resource, and the QoS class of the first thread is higher than a second target class, allocating the memory resource to the first thread from a reserved memory resource.

Based on the foregoing possible implementation, in an emergency case of a memory, a memory is allocated to a thread with a relatively high QoS class from the reserved memory resource such that processing progress of the thread with the relatively high QoS class can be ensured.

In a possible implementation, different task requests correspond to different QoS classes.

Based on the foregoing possible implementations, different QoS classes are configured when the application program processes different tasks. Therefore, based on a requirement of the user, a thread in the application program may have different processing priorities during processing of different tasks such that energy consumption of the terminal is relatively low.

According to a second aspect, this application provides a task processing method, and the method includes receiving a task request, obtaining, based on the task request, a QoS class corresponding to the task request (or a task corresponding to the task request), when a subtask corresponding to the task request is processed using a plurality of first threads, configuring QoS classes of the plurality of first threads as a QoS class of the task, where the plurality of first threads belong to at least two application programs, and processing, based on a processing sequence corresponding to the QoS classes of the plurality of first threads, a subtask corresponding to the first thread.

Generally, the application program calls a plurality of threads to execute a task. When the plurality of threads for executing the task are configured as a same priority as the QoS class of the task in the foregoing manner, a waiting problem caused by different priorities of the application can be avoided to some extent. This avoids a freezing phenomenon during task processing.

In some implementations, the plurality of first threads include a thread A and a thread B, the thread A calls the thread B to implement the task, and the thread A transfers a QoS class of the thread A to the thread B using a binder mechanism. In this way, QoS levels of both the thread B and the thread A are consistent with the QoS class of the task. This avoids priority inversion.

In some implementations, the plurality of first threads include a thread A and a thread B, and the thread A calls the thread B, and adjusts QoS classes of the thread A and the thread B based on an amount of data that is of the thread A and that is cached in the thread B. In this way, the QoS class is dynamically adjusted based on a task execution status, and especially, the QoS class is lowered when the amount of data that is of the thread A and that is cached in the thread B is relatively large, to avoid excessive supply of resources to the thread A and the thread B.

In some implementations, when one of the first threads accesses a target resource, if the target resource is locked, a QoS class of a thread that locks the target resource is configured as the QoS class of the first thread. In this way, release of the target resource can be accelerated, thereby accelerating execution of the first thread, and therefore accelerating execution of the task.

According to a third aspect, this application provides a task processing apparatus configured to perform the foregoing task processing method. The task processing apparatus includes a function module configured to perform the task processing method provided in either of the foregoing aspects or any optional manner of either of the foregoing aspects.

According to a fourth aspect, this application provides a terminal, where the terminal includes a processor and a memory, the memory stores at least one instruction, and the instruction is loaded and executed by the processor to implement operations performed in the foregoing task processing method.

According to a fifth aspect, this application provides a computer readable storage medium, where the storage medium includes at least one instruction, and the instruction is loaded and executed by a processor to implement operations performed in the foregoing task processing method.

According to a sixth aspect, this application provides a computer program product (or a computer program), where the computer program product stores at least one instruction, and the instruction is loaded and executed by a processor to implement operations performed in the foregoing task processing method.

BRIEF DESCRIPTION OF DRAWINGS

To describe the technical solutions in some of the embodiments of this application more clearly, the following briefly describes the accompanying drawings for describing the embodiments. The accompanying drawings in the following descriptions show merely some embodiments of this application, and a person of ordinary skill in the art may still derive other accompanying drawings based on these accompanying drawings.

DESCRIPTION OF EMBODIMENTS

To make the objectives, technical solutions, and advantages of this application clearer, the following further describes the implementations of this application in detail with reference to the accompanying drawings.

Figure 1:
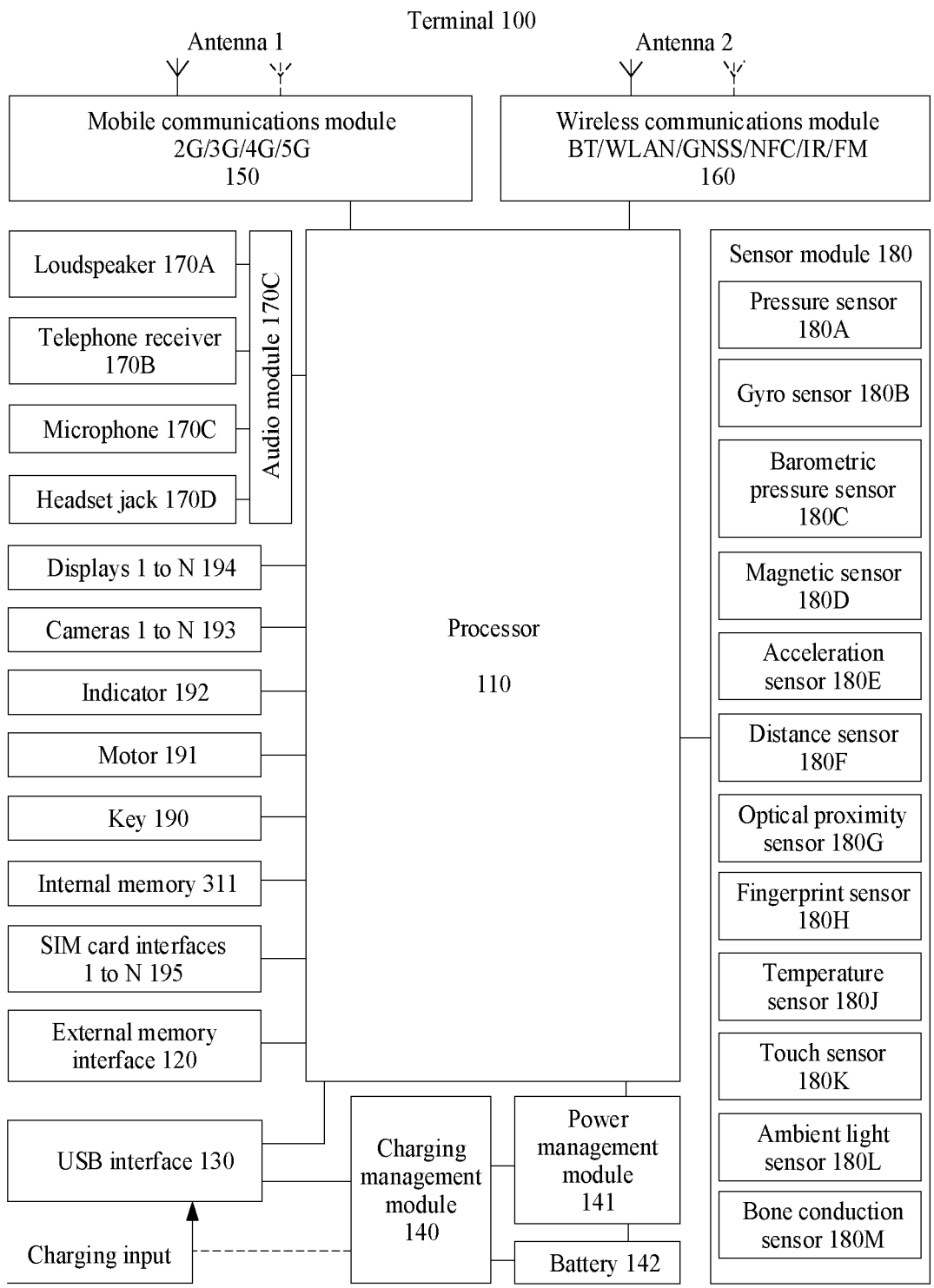
FIG. 1 is a schematic structural diagram of a terminal according to an embodiment of this application.

FIG. 1 is a schematic structural diagram of a terminal according to an embodiment of this application. A terminal 100 may include a processor 110, an external memory interface 120, an internal memory 311, a Universal Serial Bus (USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation to the terminal 100. In some other embodiments of this application, the terminal 100 may include more or fewer parts than those shown in the figure, or combine some parts, or split some parts, or have different part arrangements. The parts shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

The controller may generate an operation control signal based on instruction operation code and a time sequence signal, to control a fetch instruction and an execute instruction.

A memory may be further disposed in the processor 110, and is configured to store an instruction and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory. Repeated access is avoided, and waiting time of the processor 110 is reduced, and therefore system efficiency is improved.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a bidirectional synchronous serial bus, and includes a serial data line (SDA) and a derail clock line (SCL). In some embodiments, the processor 110 may include a plurality of groups of I2C buses. The processor 110 may be separately coupled to the touch sensor 180K, a charger, a flash, the camera 193, and the like using different I2C bus interfaces. For example, the processor 110 may be coupled to the touch sensor 180K using the I2C interface such that the processor 110 communicates with the touch sensor 180K using the I2C bus interface, to implement a touch function of the terminal 100.

The I2S interface may be used for audio communication. In some embodiments, the processor 110 may include a plurality of groups of I2S buses. The processor 110 may be coupled to the audio module 170 using the I2S bus, to implement communication between the processor 110 and the audio module 170. In some embodiments, the audio module 170 may transmit an audio signal to the wireless communications module 160 using the I2S interface, to implement a function of answering a call using a BLUETOOTH headset.

The PCM interface may also be used for audio communication, and analog signal sampling, quantization, and encoding. In some embodiments, the audio module 170 and the wireless communications module 160 may be coupled using a PCM bus interface. In some embodiments, the audio module 170 may also transmit an audio signal to the wireless communications module 160 using the PCM interface, to implement the function of answering a call using a BLU- ETOOTH headset. Both the I2S interface and the PCM interface may be used for audio communication.

The UART interface is a universal serial data bus used for asynchronous communication. The bus may be a bidirectional communications bus. The bus converts to-be-transmitted data between serial communication and parallel communication. In some embodiments, the UART interface is usually configured to connect the processor 110 and the wireless communications module 160. For example, the processor 110 communicates with a BLUETOOTH module in the wireless communications module 160 using the UART interface, to implement a BLUETOOTH function. In some embodiments, the audio module 170 may transmit an audio signal to the wireless communications module 160 using the UART interface, to implement a function of playing music using a BLUETOOTH headset.

The MIPI interface may be configured to connect the processor 110 to a peripheral device such as the display 194 or the camera 193. The MIPI interface includes a camera serial interface (CSI), a display serial interface (DSI), and the like. In some embodiments, the processor 110 communicates with the camera 193 using the CSI interface, to implement a photographing function of the terminal 100. The processor 110 communicates with the display 194 using the DSI interface, to implement a display function of the terminal 100.

The GPIO interface may be configured using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as an I2C interface, an I2S interface, a UART interface, a MIPI interface, or the like.

The USB interface 130 is an interface that complies with a USB standard specification, and may be a mini USB interface, a micro USB interface, a USB type C interface, or the like. The USB interface 130 may be configured to connect to the charger to charge the terminal 100, or may be configured to transmit data between the terminal 100 and the peripheral device, or may be configured to connect to a headset and play audio using the headset. The interface may be further configured to connect to another electronic device such as an AR device.

It may be understood that an interface connection relationship between modules shown in this embodiment of this application is merely a schematic description, and does not constitute a limitation to a structure of the terminal 100. In some other embodiments of this application, the terminal 100 may alternatively use an interface connection manner different from that in the foregoing embodiment or a combination of a plurality of interface connection manners.

The charging management module 140 is configured to receive charging input from the charger. The charger may be a wireless charger, or may be a wired charger. In some embodiments of wired charging, the charging management module 140 may receive charging input from the wired charger using the USB interface 130. In some embodiments of wireless charging, the charging management module 140 may receive wireless charging input using a wireless charging coil of the terminal 100. When charging the battery 142, the charging management module 140 may further supply power to an electronic device using the power management module 141.

The power management module 141 is configured to connect the battery 142, the charging management module 140, and the processor 110. The power management module 141 receives input of the battery 142 and/or the charging management module 140, and supplies power to the processor 110, the internal memory 311, the display 194, the camera 193, the wireless communications module 160, and the like. The power management module 141 may be further configured to monitor parameters such as a battery capacity, a battery cycle quantity, and a battery health status (electric leakage and impedance). In some other embodiments, the power management module 141 may also be disposed in the processor 110. In some other embodiments, the power management module 141 and the charging management module 140 may be alternatively disposed in a same component.

A wireless communication function of the terminal 100 may be implemented using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover a single communications frequency band or a plurality of communications frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution to wireless communication such as second generation (2G)/third generation (3G)/fourth generation (4G)/fifth generation (5G) that is applied to the terminal 100. The mobile communications module 150 may include at least one filter, a switch, a power amplifier, a low-noise amplifier (LNA), and the like. The mobile communications module 150 may receive an electromagnetic wave using the antenna 1, perform processing such as filtering and amplification on the received electromagnetic wave, and transmit the electromagnetic wave to the modem processor for demodulation. The mobile communications module 150 may further amplify a signal modulated by the modem processor, convert the signal into an electromagnetic wave using the antenna 1, and radiate the electromagnetic wave. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal using an audio device (not limited to the loudspeaker 170A, the telephone receiver 170B, and the like), or displays an image or a video using the display 194. In some embodiments, the modem processor may be an independent component. In some other embodiments, the modem processor may be independent of the processor 110, and is disposed in a same component with the mobile communications module 150 or another function module.

The wireless communications module 160 may provide a solution to wireless communication that is applied to the terminal 100, such as a wireless local area network (WLAN) (such as a WI-FI network), BLUETOOTH (BT), a global navigation satellite system (GNSS), frequency modulation (FM), a Near-Field-Communication (NFC) technology, and an infrared (IR) technology. The wireless communications module 160 may be one or more components integrated with at least one communication processing module. The wireless communications module 160 receives an electromagnetic wave using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, convert the signal into an electromagnetic wave using the antenna 2, and radiate the electromagnetic wave.

In some embodiments, the antenna 1 of the terminal 100 is coupled to the mobile communications module 150, and the antenna 2 is coupled to the wireless communications module 160 such that the terminal 100 can communicate with a network and another device using a wireless communications technology. The wireless communications technology may include a Global System for Mobile Communications (GSM), a General Packet Radio Service (GPRS), code-division multiple access (CDMA), wideband CDMA (WCDMA), time division-synchronous CDMA (TD-SCDMA), Long-Term Evolution (LTE), BT, GNSS, WLAN, NFC, FM, the IR technology, and/or the like. The GNSS may include a Global Positioning System (GPS), a global navigation satellite system (GLONASS), a BEIDOU navigation satellite system (BDS), a Quasi-Zenith Satellite System (QZSS), and/or a satellite-based augmentation system (SBAS).

The terminal 100 implements a display function using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may be a liquid-crystal display (LCD), an organic light-emitting diode (LED) (OLED), an active matrix OLED (AMOLED), a flexible LED (FLED), a mini LED, a micro LED, a micro-oLED, a quantum dot LED (QLED), and the like. In some embodiments, the terminal 100 may include one or N displays 194, where N is a positive integer greater than 1.

The terminal 100 may implement a photographing function using the ISP, the camera 193, the video codec, the GPU, the display 194, the application processor, and the like.

The ISP is configured to process data fed back by the camera 193. For example, during photographing, a shutter is turned on, and light is transmitted to a photosensitive element of the camera using a lens such that an optical signal is converted into an electrical signal, and the photosensitive element of the camera transmits the electrical signal to the ISP for processing, to convert the electrical signal into a macroscopic image. The ISP may further perform algorithm optimization on image noise, luminance, and complexion. The ISP may further optimize parameters such as exposure to a shooting scenario and color temperature. In some embodiments, the ISP may be disposed in the camera 193.

The camera 193 is configured to capture a static image or a video. An optical image of an object is generated by the lens and is projected to the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, blue (RGB) or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform or the like on frequency energy.

The video codec is configured to compress or decompress a digital video. The terminal 100 may support one or more types of video codecs. In this way, the terminal 100 may play or record videos in a plurality of encoding formats, for example, Moving Picture Experts Group (MPEG) 1, MPEG 2, MPEG 3, and MPEG 4.

The NPU is a neural network (NN) computing processor, performs fast processing on input information by referring to a structure of a biological neural network, for example, by referring to a transmission mode between neurons in a human brain, and may further continuously perform self-learning. An application such as intelligent cognition of the terminal 100 may be implemented using the NPU, such as image recognition, facial recognition, voice recognition, and text understanding.

The external memory interface 120 may be configured to connect to an external memory card such as a micro Secure Digital (Micro SD) card, to expand a storage capability of the terminal 100. The external storage card communicates with the processor 110 using the external memory interface 120, to implement a data storage function. For example, files such as music and a video are stored in the external storage card.

The internal memory 311 may be configured to store computer executable program code, and the executable program code includes an instruction. The internal memory 311 may include a program storage area and a data storage area. The program storage area may store an operating system, an application program required by at least one function (such as a sound playing function and an image playing function), and the like. The data storage area may store data (such as audio data and a phone book) and the like created during use of the terminal 100. In addition, the internal memory 311 may include a high-speed random-access memory (RAM), and may further include a non-volatile memory such as at least one magnetic disk storage component, a flash memory component, or a universal flash memory (UFS). The processor 110 executes various functional applications and data processing of the terminal 100 by running the instruction stored in the internal memory 311 and/or an instruction stored in the memory disposed in the processor.

The terminal 100 may implement an audio function such as music playing and recording using the audio module 170, the loudspeaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A is configured to convert an audio electrical signal into a sound signal. The terminal 100 may listen to music using the loudspeaker 170A, or answer a hands-free call.

The telephone receiver 170B, also referred to as an "earpiece", is configured to convert an audio electrical signal into a sound signal. When the terminal 100 answers a call or receives voice information, the telephone receiver 170B may be placed close to a human ear to listen to voice.

The microphone 170C, also referred to as a "microphone" or "microphone", is configured to convert a sound signal into an electrical signal. When making a call or sending voice information, a user may make a sound by approaching a mouth to the microphone 170C, and input the sound signal to the microphone 170C. At least one microphone 170C may be disposed in the terminal 100. In some other embodiments, two microphones 170C may be disposed in the terminal 100, and may implement a noise reduction function in addition to collecting the sound signal. In some other embodiments, three, four, or more microphones 170C may be alternatively disposed in the terminal 100, to collect the sound signal, reduce noise, identify a sound source, implement a directional recording function, and the like.

The headset jack 170D is configured to connect to a wired headset. The headset jack 170D may be the USB interface 130, or may be a 3.5 millimeter (mm) Open Mobile Terminal Platform (OMTP) standard interface, or a Cellular Telecommunications and Internet Association of the USA (CTIA) standard interface.

The pressure sensor 180A is configured to perceive a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may be at least two parallel plates including a conductive material. When force is applied to the pressure sensor 180A, capacitance between electrodes changes. The terminal 100 determines intensity of pressure based on a change of the capacitance. When a touch operation acts on the display 194, the terminal 100 detects intensity of the touch operation based on the pressure sensor 180A. The terminal 100 may also calculate a touch position based on a detection signal of the pressure sensor 180A. In some embodiments, touch operations acting on a same touch position but having different touch operation intensity may correspond to different operation instructions. For example, when a touch operation whose touch operation intensity is less than a first pressure threshold is performed on a short message application icon, an instruction for viewing a short message is executed. For example, when a touch operation whose touch operation intensity is greater than or equal to the first pressure threshold is performed on the short message application icon, an instruction for creating a new short message is executed.

The gyro sensor 180B may be configured to determine a motion posture of the terminal 100. In some embodiments, angular velocities of the terminal 100 around three axes (that is, an x-axis, a y-axis, and a z-axis) may be determined using the gyro sensor 180B. The gyro sensor 180B may be used for image stabilization during photographing. For example, when the shutter is pressed, the gyro sensor 180B detects a shaking angle of the terminal 100, calculates, based on the angle, a distance that needs to be compensated for by a lens module, and enables the lens to counteract shake of the terminal 100 through reverse motion, to implement image stabilization. The gyro sensor 180B may be further used in a navigation scenario and a motion sensing game scenario.

The barometric pressure sensor 180C is configured to measure barometric pressure. In some embodiments, the terminal 100 calculates an altitude using a barometric pressure value measured by the barometric pressure sensor 180C, to assist in positioning and navigation.

The magnetic sensor 180D includes a Hall effect sensor. The terminal 100 may detect opening and closing of a flip leather case using the magnetic sensor 180D. In some embodiments, when the terminal 100 is a flip phone, the terminal 100 may detect opening and closing of a flip based on the magnetic sensor 180D. Further, a feature such as automatic unlocking upon opening of the flip is set based on a detected opening/closing status of a leather case or a detected opening/closing status of the flip.

The acceleration sensor 180E may detect magnitude of an acceleration of the terminal 100 in each direction (generally three axes). When the terminal 100 is static, magnitude and a direction of gravity may be detected. The acceleration sensor 180E may be further configured to identify a posture of the electronic device, and is applied to applications such as landscape/portrait orientation switching and a pedometer.

The distance sensor 180F is configured to measure a distance. The terminal 100 may measure the distance using infrared or laser. In some embodiments, in a photographing scenario, the terminal 100 may measure the distance using the distance sensor 180F, to implement fast focusing.

The optical proximity sensor 180G may include, for example, an LED and an optical detector such as a photodiode. The LED may be an infrared LED. The terminal 100 emits infrared light using the LED. The terminal 100 detects infrared reflected light from a nearby object using the photodiode. When sufficient reflected light is detected, it may be determined that there is an object near the terminal 100. When insufficient reflected light is detected, the terminal 100 may determine that there is no object near the terminal 100. The terminal 100 may detect, using the optical proximity sensor 180G, that the user holds the terminal 100 to approach an ear to make a call, to automatically turn off a screen to save power. The optical proximity sensor 180G may also be used in a leather cover mode and a pocket mode to automatically unlock and lock the screen.

The ambient light sensor 180L is configured to perceive ambient light luminance. The terminal 100 may adaptively adjust luminance of the display 194 based on the perceived ambient light luminance. The ambient light sensor 180L may also be configured to automatically adjust white balance during photographing. The ambient light sensor 180L may further cooperate with the optical proximity sensor 180G to detect whether the terminal 100 is in a pocket, to prevent accidental touch.

The fingerprint sensor 180H is configured to collect a fingerprint. The terminal 100 may implement fingerprint unlocking, access an application lock, take a photo using the fingerprint, answer an incoming call using the fingerprint, and the like using a feature of the collected fingerprint.

The temperature sensor 180 J is configured to detect temperature. In some embodiments, the terminal 100 executes a temperature processing policy using the temperature detected by the temperature sensor 180J. For example, when temperature reported by the temperature sensor 180J exceeds a threshold, the terminal 100 reduces performance of a processor near the temperature sensor 180J, to reduce power consumption and implement thermal protection. In some other embodiments, when the temperature is lower than another threshold, the terminal 100 heats the battery 142, to prevent the terminal 100 from being abnormally powered off due to low temperature. In some other embodiments, when the temperature is lower than still another threshold, the terminal 100 boosts an output voltage of the battery 142, to avoid abnormal power off caused by low temperature.

The touch sensor 180K is also referred to as a touch component. The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor, to determine a type of a touch event. Visual output related to the touch operation may be provided using the display 194. In some other embodiments, the touch sensor 180K may be alternatively disposed on a surface of the terminal 100, and a location of the touch sensor 180K is different from a location of the display 194.

The bone conduction sensor 180M may obtain a vibration signal. In some embodiments, the bone conduction sensor 180M may obtain a vibration signal of a vibration bone of a vocal part of a human body. The bone conduction sensor 180M may also be in contact with a human body pulse to receive a blood pressure beating signal. In some embodiments, the bone conduction sensor 180M may be alternatively disposed in a headset, to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, an amount key, and the like. The key 190 may be a mechanical key, or may be a touch key. The terminal 100 may receive key input, and generate key signal input related to user setting and function control of the terminal 100.

The motor 191 may generate a vibration prompt. The motor 191 may be used for a vibration prompt for an incoming call, or may be used for touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. Customization of a touch vibration feedback effect may also be supported.

The indicator 192 may be indicator light, and may be configured to indicate a charging status and a battery level change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with and separation from the terminal 100. The terminal 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type, or may be of different types. The SIM card interface 195 may also be compatible with different types of SIM cards. The SIM card interface 195 may also be compatible with an external storage card. The terminal 100 interacts with a network using the SIM card, to implement functions such as calling and data communication. In some embodiments, the terminal 100 uses an eSIM, that is, an embedded SIM card. The eSIM card may be embedded in the terminal 100, and cannot be separated from the terminal 100.

A software system of the terminal 100 may use a hierarchical architecture, an event-driven architecture, a micro-kernel architecture, a micro-service architecture, or a cloud architecture. In the embodiments of this application, an ANDROID system with a hierarchical architecture is used as an example to describe a software structure of the terminal 100.

Figure 2:
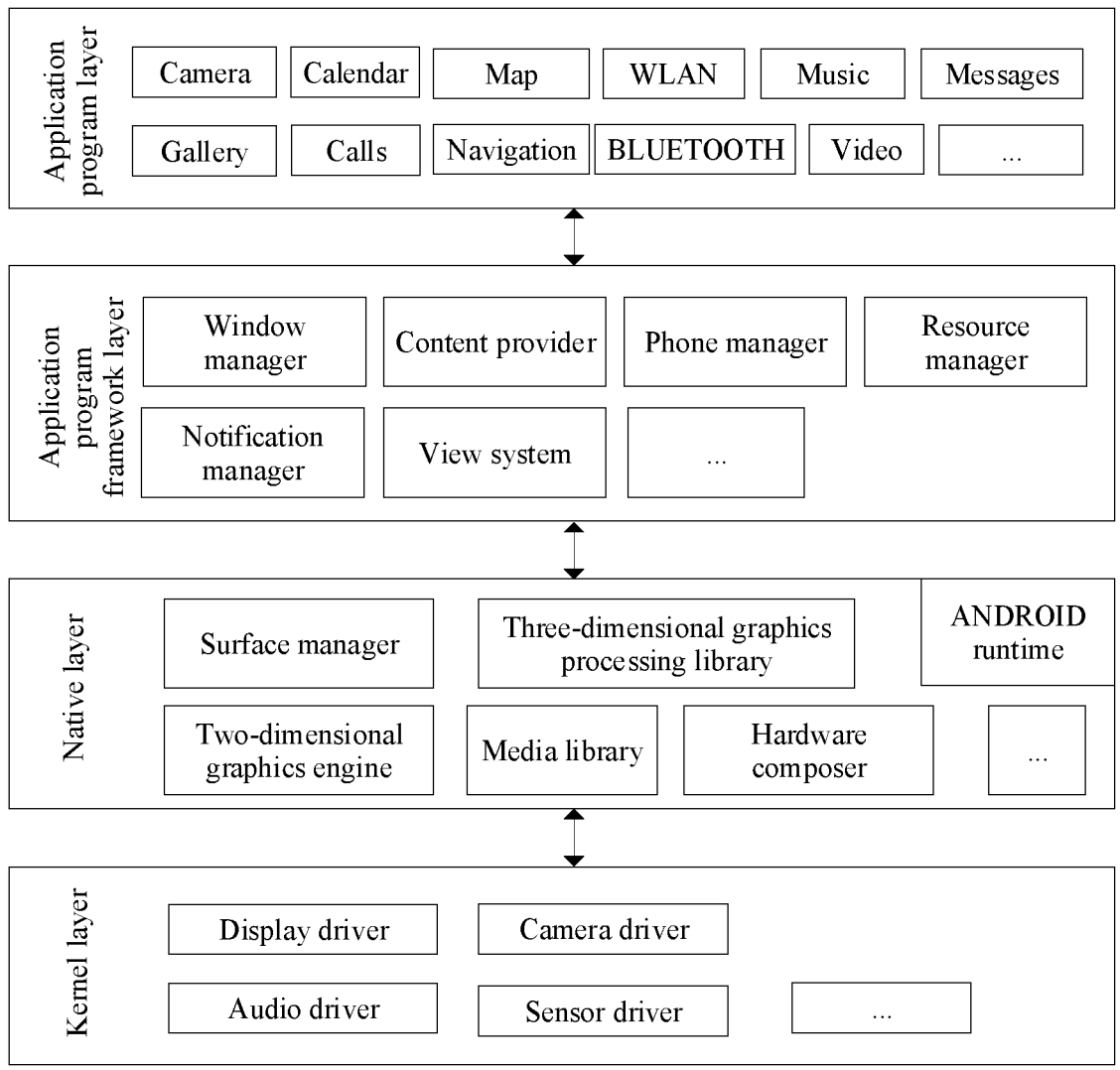
FIG. 2 is a block diagram of a software structure of a terminal according to an embodiment of this application.

FIG. 2 is a block diagram of a software structure of a terminal according to an embodiment of this application. As shown FIG. 2, software is divided into several layers in a hierarchical architecture, and each layer has a clear role and a clear responsibility. Layers communicate with each other using a software interface. In some embodiments, an ANDROID system is divided into four layers: an application program layer, an application program framework layer, ANDROID runtime, a native layer, and a kernel layer from top to bottom.

The application program layer may include a series of application program packages. As shown in FIG. 2, the application program package may include application programs such as Camera, Gallery, Calendar, Calls, Map, Navigation, WLAN, BLUETOOTH, Music, Video, and Messages.

The application program framework layer provides an application programming interface (API) and a programming framework for an application program at the application program layer. The application program framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, capture the screen, and the like.

The content provider is configured to store and obtain data and enable the data to be accessible to the application program. The data may include a video, an image, audio, dialed and answered calls, browsing history, a bookmark, a phone book, and the like.

The view system includes a visual control, for example, a control for displaying text or a control for displaying a picture. The view system may be configured to create the application program. A display interface may include one or more views. For example, a display interface including a short message notification icon may include a view for displaying text and a view for displaying a picture.

The phone manager is configured to provide a communication function of the terminal 100, for example, call status (including call connection and hang-up) management.

The resource manager provides various resources such as a localized string, an icon, a picture, a layout file, and a video file for the application program.

The notification manager enables the application program to display notification information at the status bar, and may be used to transmit a message of a notification type and may automatically disappear after a short stay without user interaction. For example, the notification manager is configured to notify a downloading complete, a message reminder, and the like. Alternatively, the notification manager may be a notification that appears at the status bar at the top of the system in a form of a diagram or scroll bar text, for example, a notification of an application program running in the background, or may be a notification that appears on the screen in a form of a dialog window. For example, text information is prompted at the status bar, a prompt tone is made, an electronic device vibrates, or indicator light blinks.

The ANDROID runtime includes a kernel library and a virtual machine. The ANDROID runtime is responsible for scheduling and management of the ANDROID system.

The kernel library includes two parts: a function that needs to be called by a JAVA language, and an ANDROID kernel library.

The application program layer and the application program framework layer run in the virtual machine. The virtual machine executes JAVA files at the application program layer and the application program framework layer as binary files. The virtual machine is configured to perform functions such as object life cycle management, stack management, thread management, security and exception management, and garbage collection.

The native layer may include a plurality of function modules such as a surface manager, a hardware composer (HWC), a media library, a three-dimensional graphics processing library (OpenGL ES), and a two-dimensional (2D) graphics engine (for example, SGL).

The surface manager is configured to manage a display subsystem, and provides fusion of 2D and 3D layers for a plurality of application programs. The HWC is configured to fuse layers synthesized by a synthesis service (SF).

The media library supports playback and recording of a plurality of common audio and video formats, a static image file, and the like. The media library supports a plurality of audio and video encoding formats such as MPEG 4, H.364, MPEG-1 Audio Layer III (MP3), Advanced Audio Coding (AAC), Adaptive Multi-Rate (AMR), JPG, and Portable Network Graphics (PNG).

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

Working processes of software and hardware of the terminal 300 are described below as an example with reference to a scenario in which an application program runs in the foreground. For example, when any application program displays a web page in the foreground, a main process of the application program uses each thread to call the three-dimensional graphics processing library or the 2D graphics engine to draw each image frame when the web page is displayed, and performs layer fusion using the HWC such that the application program can display the web page in the foreground.

Figure 3:
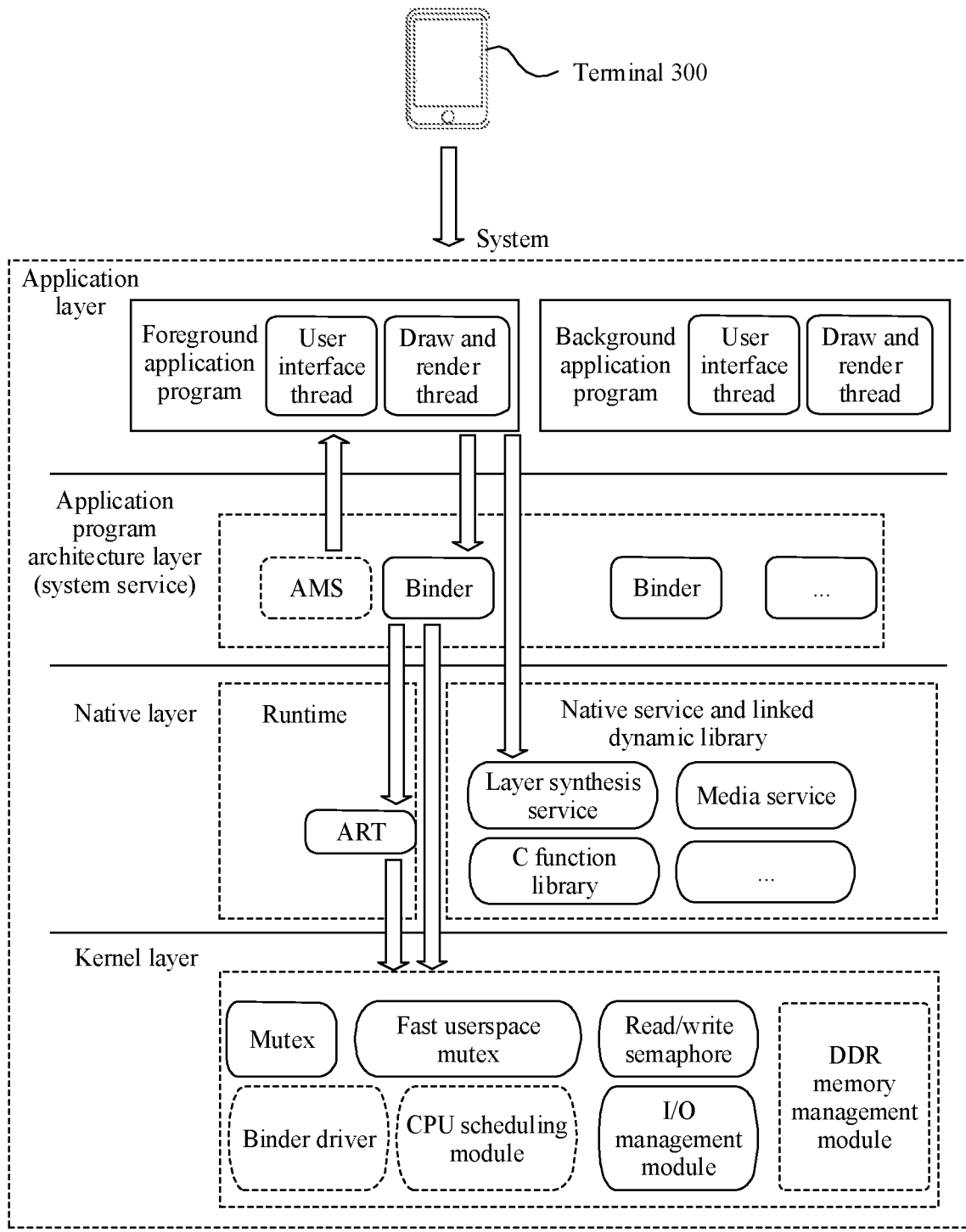
FIG. 3 is a schematic diagram of an implementation environment according to an embodiment of this application.

The software structure of the terminal is described in FIG. 2. To embody work done by software in the terminal during processing of a task related to the application program, refer to FIG. 3. FIG. 3 is a schematic diagram of an implementation environment according to an embodiment of this application. The implementation environment includes a terminal 300, and an ANDROID system may be installed on the terminal 300. The terminal may be, but is not limited to, a laptop computer, a desktop computer, a mobile phone, a smartphone, a tablet computer, a multimedia player, an e-reader, a smart in-vehicle device, a smart household appliance, an artificial intelligence device, a wearable device, an internet of things device, a virtual reality/augmented reality/hybrid reality device, or the like.

A system architecture of the terminal may include an application layer, an application program framework layer, a native layer, and a kernel layer.

The application layer is used to provide at least one application program. The application program in the terminal may be in a running state, or may be in a non-running state. When any application program is in the running state, application programs may be classified into a foreground application program and a background application program based on different running positions. The foreground application program runs in foreground and is displayed on a display interface of the terminal, and the background application program runs in background and is not displayed on the display interface of the terminal. The application layer may include at least one foreground application program and at least one background application program. Each foreground application program or background application program corresponds to one user interface (UI) thread and one render thread. The UI thread is a main process and is used to run the foreground application program or the background application program, one main process may include at least one thread, each thread is used to complete some tasks in the main process, and the render thread is a thread in the main process.

Figure 4:
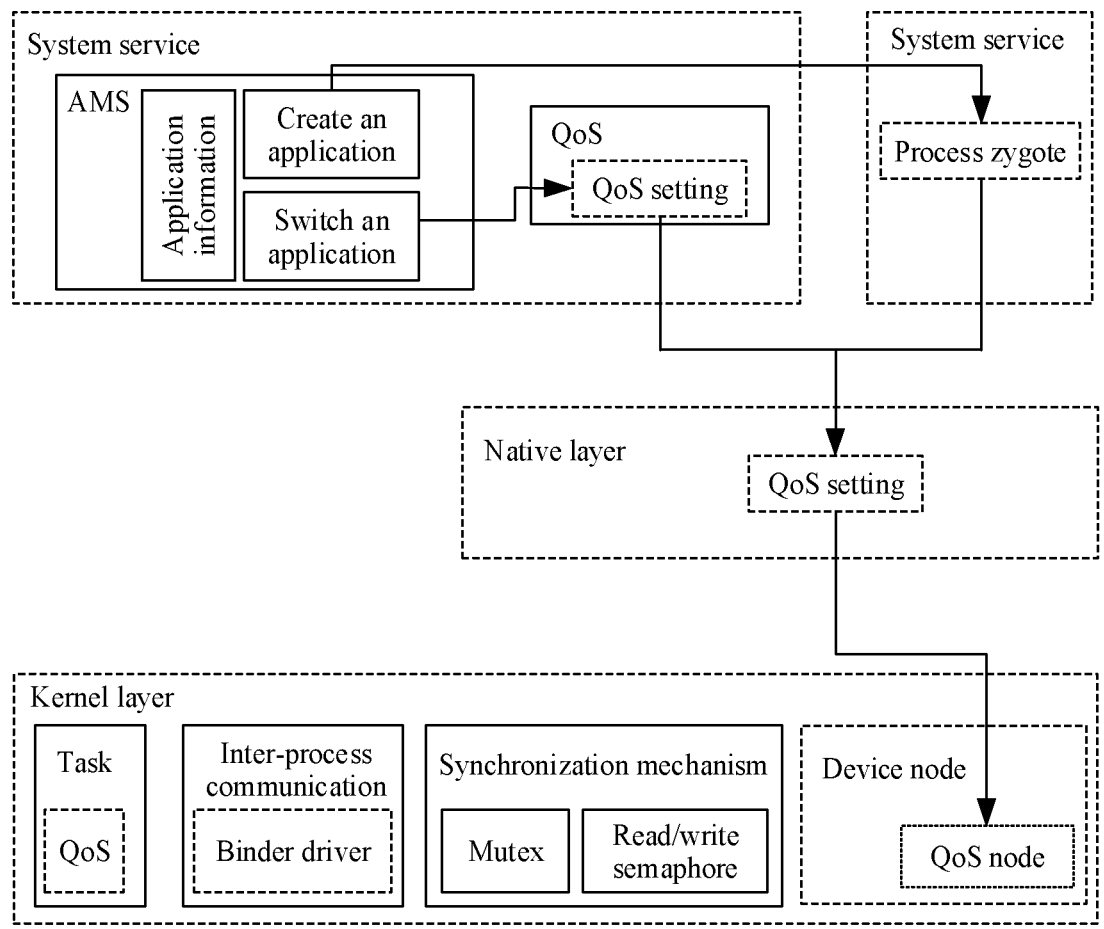
FIG. 4 is a schematic system diagram of a terminal according to an embodiment of this application.

The framework layer is configured to provide a system service and provide various APIs that may be used during construction of the application program, there is an activity manager service (AMS) component at the framework layer, and the AMS component is located in a system server at the framework layer. FIG. 4 is a schematic system diagram of a terminal according to an embodiment of this application. The AMS component may be configured to create an application and switch an application. Creating an application includes creating a foreground application program and creating a background application program. Switching an application is switching an application program from the background to the foreground or from the foreground to the background. The AMS component may be further configured to set a QoS class of the application. Setting of the QoS class is related to a task feature, and a QoS class of the foreground application is higher than a QoS class of the background application. For example, a UI thread and a render thread of the foreground application are delay-sensitive threads, and in this case, QoS classes of the UI thread and the render thread of the foreground application may be set to 2, and a UI thread and a render thread of the background application do not affect a user task and are delay-insensitive threads, and therefore, QoS classes of the UI thread and the render thread of the background application may be set to 0. It may be learned from FIG. 4 that the system service further includes a process zygote. The zygote is configured to create a UI thread and configure a QoS class of the UI thread. In this case, the UI thread is a UI thread of the application program at a startup phase. The framework layer further includes a mechanism for implementing inter-process communication, for example, a binder mechanism.

The native layer is a native service layer, and is configured to provide a native service and a linked dynamic library. The native layer has an ANDROID runtime (ART) virtual machine, a native service, and a native linked dynamic library. The ART virtual machine may provide an execution environment for a JAVA program. In the execution environment of the ART virtual machine, when two threads contend for a same JAVA object synchronization lock, the ART virtual machine may transfer a QoS class between the two threads. The native service and the native link dynamic library have a layer SF, a media service, a C function library (Libc), and the like. The SF is used to synthesize render data into each layer, the media service may play media files such as a video and music in the terminal 300, the Libc is used to provide a basic native layer library function, and the native layer library function may include a function used for system call encapsulation. In a Libc environment at the native layer, the terminal 300 may transfer a QoS class between threads that contend for a same mutex.

The kernel layer is used to provide a bottom-layer driver for various hardware of the terminal 300. There is a kernel mode synchronization mechanism at the kernel layer, and based on the kernel mode synchronization mechanism, in a mutex, a fast userspace mutex (Futex), a read/write semaphore, and another lock, when any thread fails to obtain the lock, the terminal 300 may transfer a QoS class of the thread to a lock holder thread, and enable the thread to queue in a lock waiting queue based on the QoS class of the thread. The kernel layer further includes a binder driver, a CPU scheduling module, an input/output (I/O) management module, and a double data rate (DDR) memory management module. The binder driver is a core module for inter-process communication (IPC) in an ANDROID system such that when a thread with a QoS class requests a binder service, a thread on a server side inherits the QoS class of the requester. The CPU scheduling module is configured to implement thread scheduling in the ANDROID system. The CPU scheduling module includes a QoS scheduling module. The QoS scheduling module is configured to add a QoS recording field to a thread control block structure, and initialize a QoS value during creation of a thread. For a thread of a CFS scheduling type, the QoS scheduling module is further configured to during task selection, when a task with a QoS class in a ready queue is ready, select a task based on the QoS class for execution, or otherwise, select a task based on a priority in CFS scheduling for execution. The I/O scheduling module is configured to implement I/O enqueuing and traffic limiting based on a QoS class of a thread that submits an I/O request. A memory reservation module is newly added to the DDR memory management module. When a thread with a relatively high QoS class fails to apply for a memory, the memory reservation module may directly obtain the memory from a reserved memory to avoid entering an original slow path of a LINUX kernel. The thread with the relatively high QoS class may be a thread whose QoS class is greater than or equal to 2. The kernel layer further includes a device node. As shown in FIG. 4, a QoS device node is configured on the device node, and the QoS device node is configured to configure a QoS class and clean the QoS class. The terminal 300 may access the QoS device node using a function (ioctl) that is in a device drive program and that is used to manage an I/O channel of the device.

Figure 5:
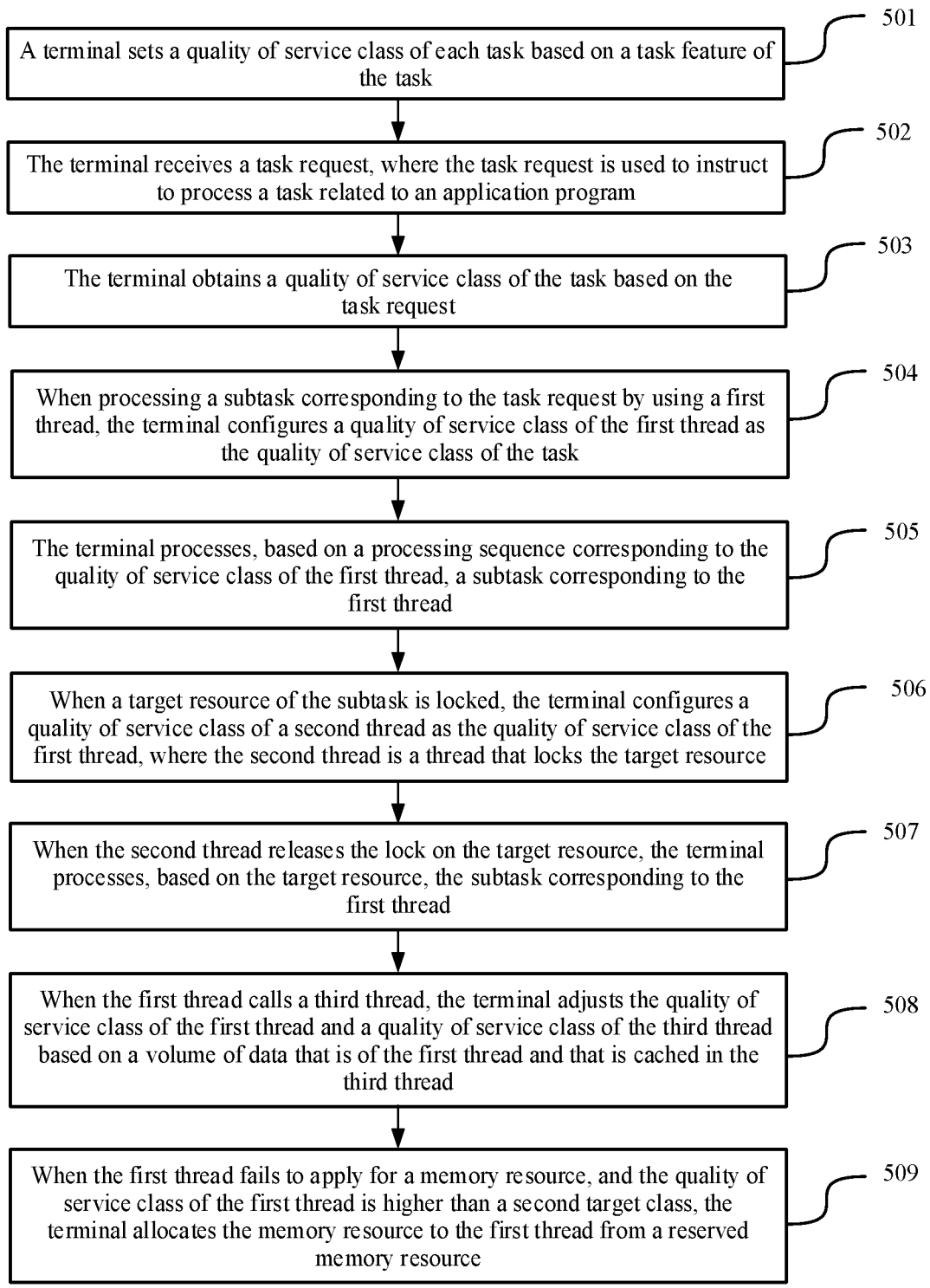
FIG. 5 is a flowchart of a task processing method according to an embodiment of this application.

The hardware and the software of the terminal are systematically described above. Further, to reflect a task processing process of the terminal, a specific embodiment is used for description herein. FIG. 5 is a flowchart of a task processing method according to an embodiment of this application. A method procedure provided in this embodiment of this application includes the following steps.

501: A terminal sets a QoS class of each task based on a task feature of the task.

A task feature of a task can reflect a service requirement of a user for the task. Therefore, different tasks have different task features. In this case, different QoS classes may be allocated to tasks using task features such that each QoS class may reflect a different service requirement. To be specific, a task with a higher QoS class indicates a higher service requirement of the user for the task, and a task with a lower QoS class indicates a lower service requirement of the user for the task.

The QoS class may be represented by a character string, and different character strings represent different QoS classes. For example, there are four QoS classes: a class 1, a class 2, a class 3, and a class 4 in ascending order, or a class A, a class B, a class C, and a class D in ascending order. Based on a service requirement reflected by a task feature of a task, a skilled person may preset different QoS classes for different tasks. In a possible implementation, each task corresponds to one task identifier. For any task, the skilled person sets a QoS class of the task based on a task feature corresponding to a task identifier of the task. The task identifier is used to indicate the task, the task identifier may be a start identifier, and the start identifier is used to indicate a start task, or the task identifier may be a slip identifier, and the slip identifier is used to indicate a slip task. Certainly, the task identifier may be alternatively represented by an identifier of another task. The task identifier may be represented by a character string, and different character strings are used to indicate different task identifiers. For example, a character string "start" is used to indicate the start identifier, and a character string "slip" is used to indicate the slip identifier. The task identifier is not limited in this embodiment of this application.

The skilled person may preset a QoS class of each task in a first QoS class table. The first QoS class table may be used to record a task identifier, a task feature, and a QoS class of the task. It may be learned from Table 1 that task identifiers 1 to 4 respectively represent tasks 1 to 4. The task 1 is a task related to reliability experience, and a QoS class of the task 1 is 4. The task related to reliability experience may be a task of an application program that has not been run and that needs to be immediately run by the user in foreground when the terminal is running a large quantity of application programs. This type of task is a task mainly for an extreme scenario such as degradation recovery. For example, when the user needs to make a call using the terminal, a large quantity of application programs run in the terminal in this case and occupy a large quantity of resources in the terminal, but a call task needs to be immediately executed. In this case, the call task is a task in the extreme scenario, and the user has a relatively high requirement for task reliability experience. The task 2 is a task related to interaction, and a QoS class of the task 2 is 3. A service of quality requirement of the user for the task is that when an energy efficiency ratio is mediocre, a lower delay requirement is better, and a delay of feedback and a delay of loading are mainly required to be reduced. The task 3 is a task related to rendering, and a QoS class of the task 3 is 2. A service of quality requirement of the user for the task is that the task needs to be completed within a specific time period, and requires that a lower delay and a lower delay variation are better in a case of an optimal energy efficiency ratio. The task 4 is a default task that is normally executed by the terminal, and a QoS class of the task 4 is 1. The task 5 is a task running in background, and a QoS class of the task 5 is 0.

TABLE 1

| Task identifier | Task feature | QoS class |
| --- | --- | --- |
| Task identifier 1 | Task related to reliability experience | 4 |
| Task identifier 2 | Task related to interaction | 3 |
| Task identifier 3 | Task related to rendering | 2 |
| Task identifier 4 | Default task | 1 |
| Task identifier 5 | Task running in the background | 0 |

The skilled person may further set a QoS class of each task using a task type, and the task type is used to indicate a degree of importance of the task. A task with a higher degree of importance has a higher QoS class, and a task with a lower degree of importance has a lower QoS class. The skilled person may preset the QoS class of each task in the first QoS class table. The task type may be alternatively represented by a character string, and different character strings are used to represent different task types. For example, a task type "very important" may be represented by a character string "A".

In a possible implementation, the skilled person may preset a QoS class of each task in a second QoS class table. The second QoS class table is used to record a task identifier, a task type, a task feature, and a QoS class of the task. As shown in Table 2, a task type of a task whose QoS class is 4 may be very important, a task type of a task whose QoS class is 3 may be quite important, a task type of a task whose QoS class is 2 may be relatively important, a task type of a task whose QoS class is 1 may be important, and a task type of a task whose QoS class is 0 may be unimportant.

TABLE 2

| Task identifier | Task type | Task feature | QoS class |
| --- | --- | --- | --- |
| Task identifier 1 | Very important (critical) | Task related to reliability experience | 4 |
| Task identifier 2 | Quite important (excellent effort) | Task related to interaction | 3 |
| Task identifier 3 | Relatively important (deadline effort) | Task related to rendering | 2 |
| Task identifier 4 | Important (best effort) | Default task | 1 |
| Task identifier 5 | Unimportant (background) | Task running in the background | 0 |

It should be noted that, a process shown in step 501 may be a process in which the terminal obtains, during initialization, the QoS class that is of each task and that is preset by the skilled person. The terminal needs to obtain the QoS class only once, and the terminal does not need to perform step 501 in a subsequent running process. In a subsequent task processing process, the terminal may directly process a related task based on the QoS class obtained during initialization.

502: The terminal receives a task request, where the task request is used to indicate to process a task related to an application program.

The terminal may trigger execution of step 502 based on an operation of the user. Step 502 may be completed using an AMS component in the terminal. A start task is used as an example. When the user taps an icon of an application program whose name is ABC on a display interface of the terminal, the terminal may send, to the AMS component using the display interface of the terminal, a task request used to start the application program ABC such that the AMS component of the terminal may receive the task request.

503: The terminal obtains a QoS class of the task based on the task request.

The terminal may obtain the QoS class of the task based on a task identifier that is of the task and that is in the task request. In a possible implementation, when detecting the task identifier in the task request, the terminal searches the first QoS class table or the second QoS class table for a QoS class corresponding to the task identifier, to determine the QoS class of the task.

In some possible implementations, before obtaining the QoS class of the task, the terminal needs to first determine a status of the application program corresponding to the task, and the terminal can obtain the QoS class of the task only when the application program is in a foreground running state or in a non-running state. The status of the application program includes a running state and a non-running state. The running state of the application program includes a foreground running state and a background running state, the foreground running state is used to indicate that the application program is running in the foreground, and the background running state is used to indicate that the application program is running in the background. The non-running state is used to indicate that the application program is not running in the terminal.

The terminal may detect a current status of the application program using the AMS component, to determine the status of the application program. In a possible implementation, when the terminal receives the task request, the terminal detects, using the AMS component, the status of the application program indicated by the task request. When the status of the application program is the foreground running state or the non-running state, the terminal performs step 503. When the running state of the application program is the background running state, the terminal does not perform step 503 or subsequent steps.

It should be noted that this embodiment of this application is described only using an example in which the terminal obtains the QoS class of the task in real time only if the task request related to the application program is obtained when the application program is running in the foreground or is not running. That is, once the application program runs in the background, the terminal does not need to obtain the QoS class of the task. In some embodiments, the terminal may further obtain the QoS class when executing a specific task in the background. This is not limited in this embodiment of this application.

504: When processing a subtask corresponding to the task request using a first thread, the terminal configures a QoS class of the first thread as the QoS class of the task.

The first thread may be a main process of the application program, or may be another thread. The first thread is not limited in this embodiment of this application. When processing the task corresponding to the application program, the terminal may complete the task using a plurality of threads of the application program. Each of the plurality of threads is used to complete some tasks in the task, and some tasks may also be considered as subtasks in the task. When a corresponding subtask of each of the plurality of threads is completed, the terminal completes processing of the task.

The terminal may configure the QoS class of the first thread in a thread control block structure of the first thread, and the thread control block structure is used to store thread information such as the QoS class and a quantity of called threads. In a possible implementation, the terminal configures a QoS class field in the thread control block structure of the first thread of the application program as the QoS class of the task.

When running an application program, the terminal may run the application program based on a main process, and the main process may be used to process a task related to the application program. That is, one application program corresponds to one main process, and one main process may be used to process a plurality of tasks. Alternatively, the main process may use at least one process or at least one thread to process one task. Each process may include at least one thread, and the main process may also be considered as one thread. When the terminal processes the task based on the main process, step 504 may be implemented using a process shown in the following steps 5041 and 5042.

5041: The terminal configures a QoS class of the main process of the application program as the QoS class of the task.

The terminal may set the QoS class of the main process in a process control block structure of the main process, and the process control block structure is used to store information about the main process such as the QoS class and a quantity of threads. In a possible implementation, in a QoS class field in the process control block structure of the main process, the terminal configures the QoS class of the main process as the QoS class of the task.

It should be noted that before the terminal sets the QoS class of the main process of the application program, the terminal needs to obtain the main process of the application program based on the task request. Obtaining the main process of the application program means determining the main process of the application program or creating the main process of the application program. In a possible implementation, the terminal obtains, based on an object identifier that is of the task and that is in the task request, the main process corresponding to the task. The terminal may obtain, in either of the following manners 1 and 2, the main process corresponding to the task.

In the manner 1, when the terminal detects a main process corresponding to the task request, the terminal directly determines the main process.

Figure 6:
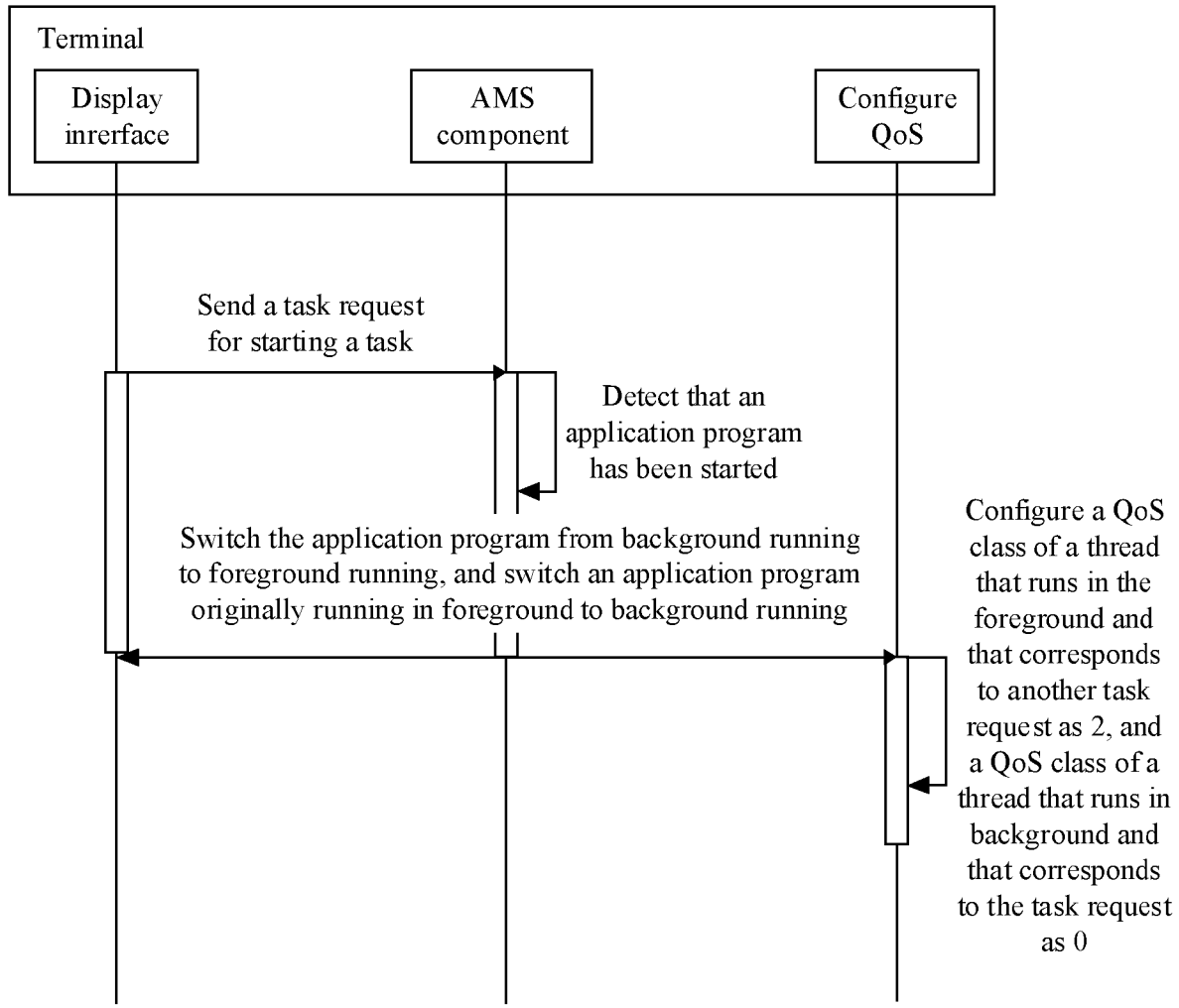
FIG. 6 is a flowchart of a task processing method based on hot start according to an embodiment of this application.

The terminal may directly obtain, from a system of the terminal based on the object identifier that is of the task and that is in the task request, the main process corresponding to the task. One object identifier corresponds to one main process. FIG. 6 is a flowchart of a task processing method based on hot start according to an embodiment of this application. The display interface of the terminal sends a task request for starting a task to the AMS component. When the AMS component of the terminal receives the task request, the AMS component detects whether a main process corresponding to the object identifier exists in the system of the terminal. When the AMS component detects the main process in the system of the terminal, it indicates that the application program is started, and the terminal calls a start process, and sends a main process obtaining request to a zygote using the start process, where the main process obtaining request carries a QoS class of the task and the object identifier in the task request. The zygote obtains, using the process obtaining request, the main process corresponding to the task request, and the terminal switches an application program corresponding to the object identifier from background to foreground, and displays content of the application program on the display interface of the terminal.

It should be noted that the main process of the application program is determined in the foregoing manner 1 in a scenario in which the application program has been started.

In the manner 2, when the terminal fails to detect a main process corresponding to the task request, the terminal creates the main process corresponding to the task request.

Figure 7:
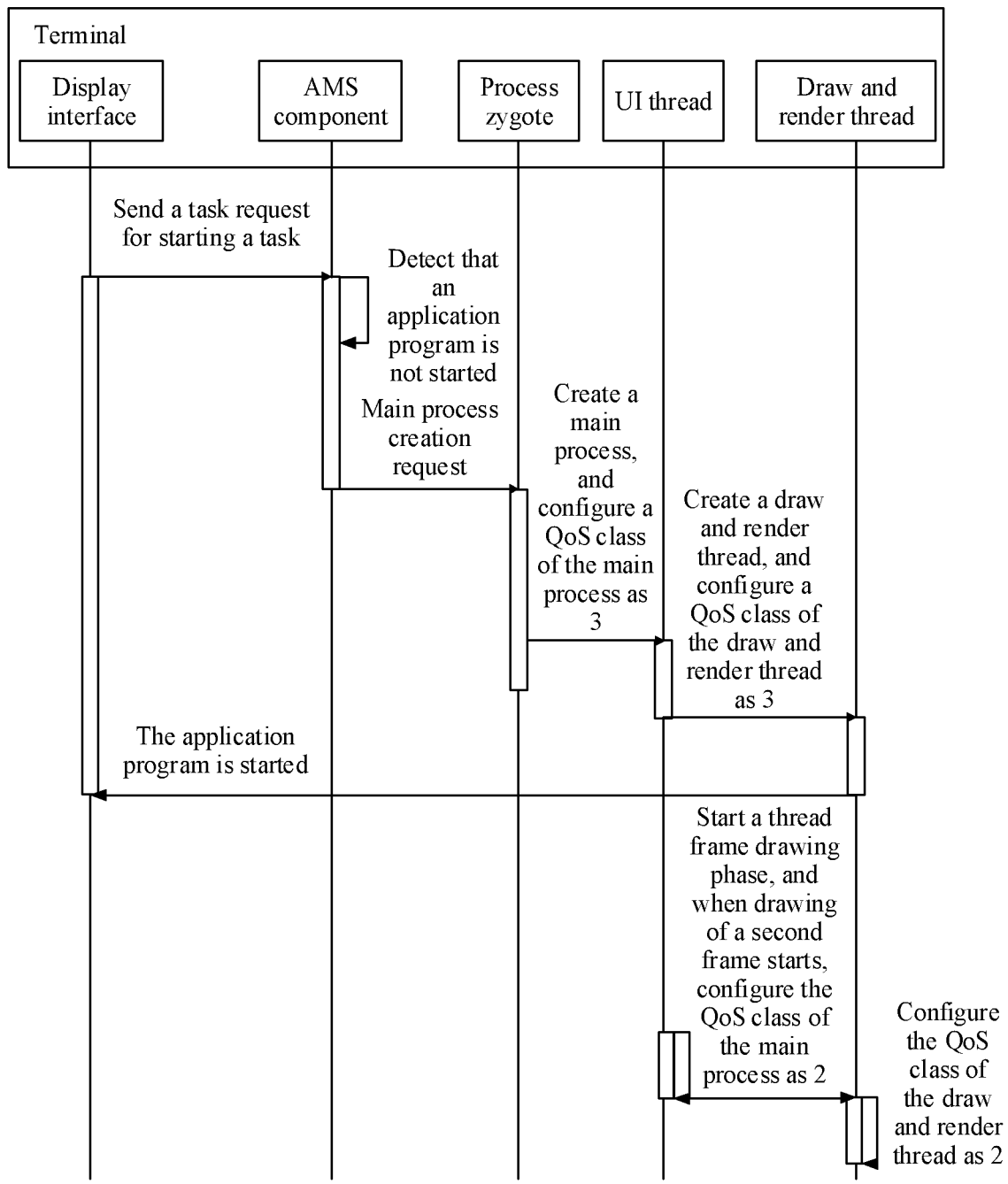
FIG. 7 is a flowchart of a task processing method based on cold start according to an embodiment of this application.

The terminal may create, based on a task identifier and an object identifier of the task that are in the task request, the main process corresponding to the task request. FIG. 7 is a flowchart of a task processing method based on cold start according to an embodiment of this application. The display interface of the terminal sends a task request for starting a task to the AMS component. When the AMS component of the terminal receives the task request, the AMS component detects whether a main process corresponding to the object identifier exists in the system of the terminal. When the AMS component cannot detect the main process in the system of the terminal, it indicates that the application program has not been started. The terminal calls a start process, and the terminal sends a main process creation request to a zygote using the start process. The main process creation request carries a QoS class of the task, a cold start identifier, and the object identifier in the task request. The cold start identifier is used to indicate that a to-be-created main process is used for cold start, the cold start identifier may be stored in an extended start process parameter field, and the zygote creates, based on the main process creation request, the main process corresponding to the task request. A representation form of the cold start identifier is not limited in this embodiment of this application.

It should be noted that the terminal may alternatively obtain, in another manner, the main process corresponding to the task request. The other manner of obtaining the main process is not limited in this embodiment of this application, and the main process of the application is determined in the manner 2 in a scenario in which the application program has not been started.

The terminal may perform step 5041 using the zygote. The QoS class of the main process is determined by a QoS class of a task to be processed by the main process. As shown in FIG. 7, when the zygote completes creation of the main process based on the main process creation request, the main process is currently used to process the task request, and the zygote configures a QoS class in the main process creation request as the QoS class of the main process.

It should be noted that different task requests correspond to different task quality classes. Therefore, when the terminal processes different task requests using the first thread of the application program, the QoS class of the first thread corresponds to different task quality classes. The application program has different foreground running states, and the foreground running states include a startup state, a running state, and a slipping state. The startup state is used to indicate that the application program is in a startup process, the running state is used to indicate that the application program is running, and the slipping state is used to indicate that the application program slips on the display interface of the terminal. As shown in FIG. 7, when content in an application program corresponding to the object identifier in the main process obtaining request is displayed on the display interface, it indicates that a task of starting the application program by the terminal is completed, and the application program is not in the startup state. When the application program is in the running state, the terminal may reconfigure the QoS class of the main process of the application program and a QoS class of a thread. For example, in a rendering scenario, a QoS class of a render task of an application program is configured as 2, a QoS class of a start task is configured as 3, and a QoS class of a background running task is configured as 0. In this case, when the terminal is in the startup state, the terminal configures the QoS class of the main process as 3 (that is, the same as the start task), and when the terminal starts the render task, the zygote configures the QoS class of the main process and a QoS class of a render process as 2 (that is, the same as the render task).

It should be noted that, during processing of the task, if the application program is switched from foreground running to background running, the terminal configures, as a first target class, a QoS class of a thread that is of the application program and that corresponds to the task. The first target class may be any lower class in QoS classes, for example, the class 0 in Table 1. The first target class is not limited in this embodiment of this application. It should be noted that, when processing the task request, the terminal switches the application program corresponding to the task request from foreground running to background running, and the terminal configures only a QoS class of a thread corresponding to the task request, but does not configure a QoS class of a thread corresponding to another task request.

In a possible implementation, when processing the task corresponding to the task request, if the terminal detects that any application program is switched from foreground running to background running, the terminal configures a QoS class of a main process or a thread of the application program as 0 using the zygote, and the main process or the thread of the application corresponds to the task request. FIG. 6 is still used as an example. When content in the application program is displayed on the display interface, it indicates that an application program originally displayed on the display interface is switched from foreground running to background running. In this case, the terminal configures, using the zygote, the QoS class of the thread corresponding to the task request as 0, and configures a QoS class of a thread running in the foreground and corresponding to another task request as 2.

Step 5042: When the main process of the application program executes a subtask corresponding to the task request using any thread, the terminal configures a QoS class of the thread as the QoS class of the task.

The any thread used by the main process may be any thread in the main process, or may be any thread called by the main process. In addition, when the any thread calls another thread to process the subtask corresponding to the task request, the terminal configures a QoS class of the other thread as the QoS class of the any thread.

In a possible implementation, the main process created by the zygote based on the main process creation request is a UI thread, and the UI thread creates a render thread in a startup process. After the zygote detects that creation of the render thread is completed, the zygote configures a QoS class of the render thread as a QoS class of the UI thread.

In a possible implementation, in an execution process, the main process may send a thread calling request to a binder driver in the terminal based on a binder synchronous calling mechanism. When the binder driver determines a target thread called by the main process, the terminal configures a QoS class of the target thread as the QoS class of the main process using the main process, and when the terminal completes execution of the target thread, the target thread sends an execution result to the main process using the binder driver, and in addition, the target thread updates the QoS class of the target thread to an original QoS class of the target thread.

It should be noted that, the any thread used by the main process may further call another thread. When the any thread calls another thread, the terminal configures a QoS class of the other thread as the QoS class of the any thread. In a possible implementation, when the thread calls another thread, in a QoS class field in a thread control block structure of the other thread, the terminal configures a QoS class of the other thread as the QoS class of the task.

Figure 8:
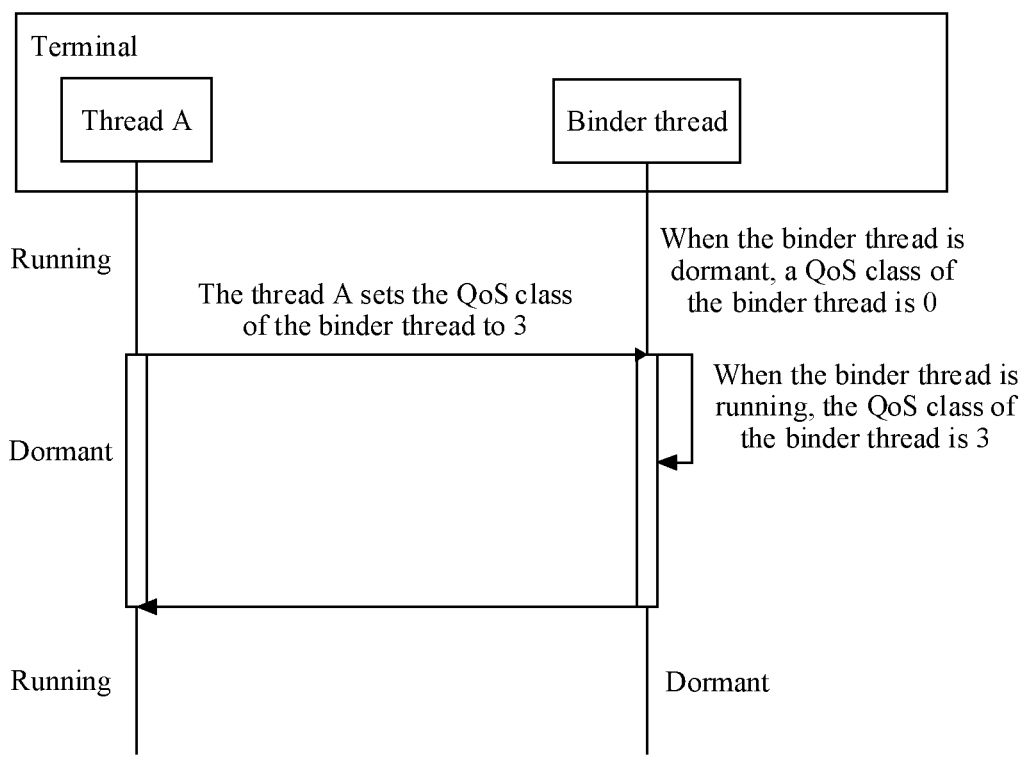
FIG. 8 is a flowchart of QoS class synchronization according to an embodiment of this application.

FIG. 8 is a flowchart of QoS class synchronization according to an embodiment of this application. A thread A sends a binder request to a binder driver. A QoS class of the thread A is 3, and the binder request is a thread calling request. In a binder transaction function in the binder driver, a binder thread is selected as a called target thread, and the binder thread is any thread that can be called by the thread A. When the binder thread is not called, the binder thread is dormant, and a QoS class of the binder thread is 0. When the binder thread is called by the thread A, the thread A configures the QoS class of the binder thread from 0 to 3 (that is, the QoS class of the thread A). When the binder thread runs, the QoS class of the binder thread is 3. When the terminal executes the binder thread, the terminal temporarily does not execute the thread A, and the thread A is dormant. When execution of the binder thread is completed, the binder thread sends an execution result to the thread A using the binder driver, and the binder thread configures the QoS class of the binder thread as the original QoS class 0. After the thread A receives the execution result, the terminal continues to execute thread A.

505: The terminal processes, based on a processing sequence corresponding to the QoS class of the first thread, the subtask corresponding to the first thread.

When processing the task request, the terminal may generate a plurality of subtasks of the task. The terminal may complete the plurality of subtasks using at least one thread or at least one process, and each thread is used to complete some subtasks in the plurality of subtasks.

The processing sequence may be determined by the QoS class of the first thread. In a possible implementation, before the subtask is inserted into a subtask that is in a processing queue and whose QoS class is lower than the QoS class of the first thread or that has no QoS class, the subtask corresponding to the first thread is processed based on a sequence in the processing queue.

When there is a plurality of priority types of the thread, a priority of a QoS type is higher than a priority of another type, and the priority of the QoS type is a priority represented by the QoS class. For example, the priority type includes a priority of a first in first out (FIFO) type and the priority of the QoS type, and the priority of the FIFO type complies with a first in first out principle. To be specific, a subtask of any thread carrying a FIFO priority enters the processing queue first, and relative to the subtask of the thread carrying the FIFO priority, the terminal preferentially processes the subtask that enters the processing queue first. When threads corresponding to subtasks in the processing queue have priorities of a same type, the terminal preferentially processes a subtask of a thread with a highest priority.

In this case, a same QoS class is configured for the main process and the thread related to the task such that all threads and processes that are used by the terminal to process the task request have a same QoS class, and when processing the subtask, all used threads may queue in the processing queue based on the same QoS class, to avoid a problem that queuing takes a relatively long time because a priority of any called thread is relatively low. This avoids freezing caused by the problem during processing of the task.

After obtaining, from the processing queue, the subtask corresponding to the first thread, the terminal may process the subtask corresponding to the first thread. In a possible implementation, when the subtask corresponding to the first thread is at a queue head of the processing queue, the terminal obtains the subtask corresponding to the first thread, and processes the subtask corresponding to the first thread. When the terminal processes the subtask, the subtask dequeues from the processing queue. When the terminal completes processing of the subtask, the terminal obtains a subtask of a next thread from the queue head of the processing queue.

It should be noted that, when the terminal completes execution of all threads related to the task request, the terminal completes processing of the task request.

506: When a target resource of the subtask is locked, the terminal configures a QoS class of a second thread as the QoS class of the first thread, where the second thread is a thread that locks the target resource.

It should be noted that, when an original QoS class of the second thread is lower than the QoS class of the first thread, the terminal performs step 506, otherwise, the terminal does not perform step 506.

In a possible implementation, the terminal may complete step 507 using a process shown in the following steps 506A to 506C.

Step 506A: The terminal locks the target resource when executing the subtask corresponding to the first thread.

The terminal may perform step 506A using the first thread. Before the terminal locks the target resource, the terminal detects the target resource. When a status of the target resource is a locked state, the first thread cannot lock the target resource. When the terminal detects that the status of the target resource is an unlocked state, the first thread may lock the target resource. The locked state is used to indicate that the target resource is locked, and the unlocked state is used to indicate that the target resource is not locked.

Step 506B: The terminal determines the second thread when the target resource fails to be locked.

The terminal may perform step 506B using the first thread. When the first thread detects that the status of the target resource is the locked state, the first thread fails to lock the target resource.

The terminal may determine the second thread using a target function. In a possible implementation, the terminal determines the second thread using a lock object and the target function. The lock object is memory data of the lock on the target resource, the memory data stores information that may indicate the first thread, and the target function is used to obtain information that is about the second thread and that is stored in the memory data of the lock object. For example, the lock on the target resource is a mutex, and the terminal may determine the second thread using a target function mutex_lock (A), where A is a lock object, and A stores information indicating the second thread. For another example, the lock on the target resource is a read/write semaphore, and the terminal may determine the second thread using a target function rwsem (B), where B is a lock object, and B stores information indicating the second thread.

Step 506C: When the QoS class of the second thread is lower than the QoS class of the first thread, the terminal updates the QoS class of the second thread to the QoS class of the first thread.

The terminal may perform step 506C using the first thread. The first thread updates content in a QoS class field in a thread control block structure of the second thread, to update the QoS class of the second thread. In a possible implementation, in the QoS class field in the thread control block structure of the second thread, the first thread configures the QoS class of the second thread as the QoS class of the first thread.

The QoS class of the second thread is updated to the QoS class of the first thread such that the QoS class of the second thread is the same as the QoS class of the first thread. Therefore, when the second thread releases the lock on the target resource, the first thread may immediately lock the target resource.

507: When the second thread releases the lock on the target resource, the terminal processes, based on the target resource, the subtask corresponding to the first thread.

The terminal may perform step 507 using the first thread. When the first thread fails to perform locking, the terminal waits in a waiting queue of the target resource based on the QoS class of the first thread. After the second thread releases the lock on the target resource, the first thread processes, based on the target resource, the subtask corresponding to the first thread. The waiting queue of the target resource is used to store each thread used to store the to-be-processed target resource.

A process in which the first thread waits in the waiting queue of the target resource based on the QoS class of the first thread is similar to a process in which the subtask of the first thread waits in the processing queue. The process in which the first thread waits in the waiting queue of the target resource based on the QoS class of the first thread is not described in detail in this embodiment of this application.

In a possible implementation, step 507 may be implemented using a process shown in the following steps 507A and 507B.

Step 507A: After the second thread releases the lock on the target resource, the terminal locks the target resource based on a sequence in the waiting queue of the target resource, to restore the original QoS class of the second thread, where the waiting queue of the target resource is used to store a thread to process the target resource.

The terminal may lock the target resource using the first thread, and the terminal may restore the original QoS class of the second thread using the second thread. The original QoS class of the second thread is a QoS class before the first thread configures the QoS class of the second thread.

After any thread releases the lock on the resource, the target resource is locked by a thread that is after the any thread in the waiting queue of the target resource and that is adjacent to the any thread. In a possible implementation, when the first thread updates the status of the target resource to the locked state, the first thread successfully locks the target resource.

When the QoS class of the second thread is relatively low, or the second thread has no QoS class, if the QoS class of the second thread is not reconfigured, after the second thread releases the lock, a thread with a same class as the second thread locks the target resource, but the first thread can lock the target resource based on a position in the waiting queue only after all locks held by a thread with a low QoS class in the queue of the target resource are released, thereby causing priority inversion. When the terminal configures the QoS class of the second thread as the same QoS class as the first thread, because the second thread currently holds the lock, the first thread is adjacent to the second thread when queuing in the waiting queue, and it may also be considered that the first thread is at the queue head of the waiting queue. After the second thread releases the lock, the first thread may immediately lock the target resource. This avoids priority inversion.

Step 507B: After the target resource is locked, the terminal processes the subtask based on the target resource.

The terminal may perform step 507B using the first thread. When the first thread executes the task request, if target processing needs to be performed on the target resource, after the first thread locks the target resource, the first thread may perform target processing on the target resource. The target processing may be any processing manner, for example, reading data or writing data.

Figure 9:
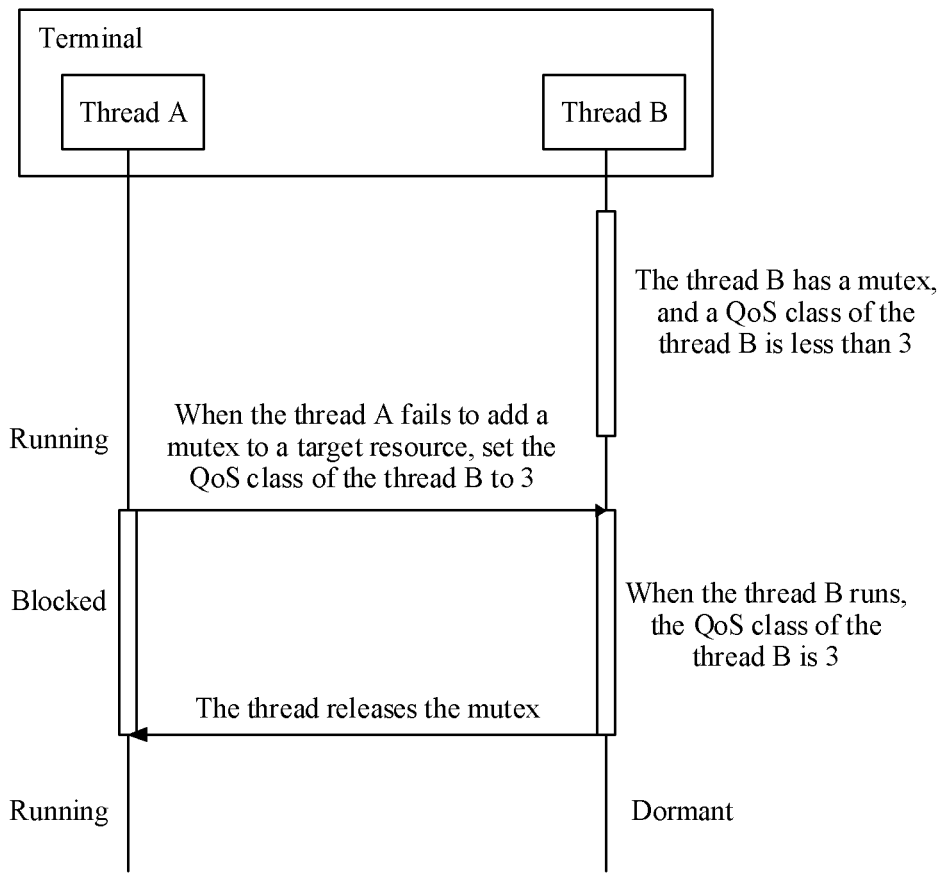
FIG. 9 is a flowchart of mutex synchronization according to an embodiment of this application.

To further describe a process shown in steps 506 and 507, refer to FIG. 9. FIG. 9 is a flowchart of mutex synchronization according to an embodiment of this application. It may be learned from FIG. 9 that a current QoS class of the thread A is 3. When the thread A fails to add a mutex to the target resource, the thread A may find the second thread based on the target resource using a mutex_lock function. The second thread is the thread B, the thread A sets content in a QoS field in a thread control block of the thread B to content in a QoS field in a thread control block of the thread A, that is, sets a QoS class of the thread B to 3. The thread A queues in the waiting queue of the target resource based on the QoS class of the thread A. When the thread B releases a lock, the thread B modifies content in the QoS field in the thread control block of the thread B to original content, and the thread A locks the target resource, and processes, based on the target resource, a subtask corresponding to the thread A.

Figure 10:
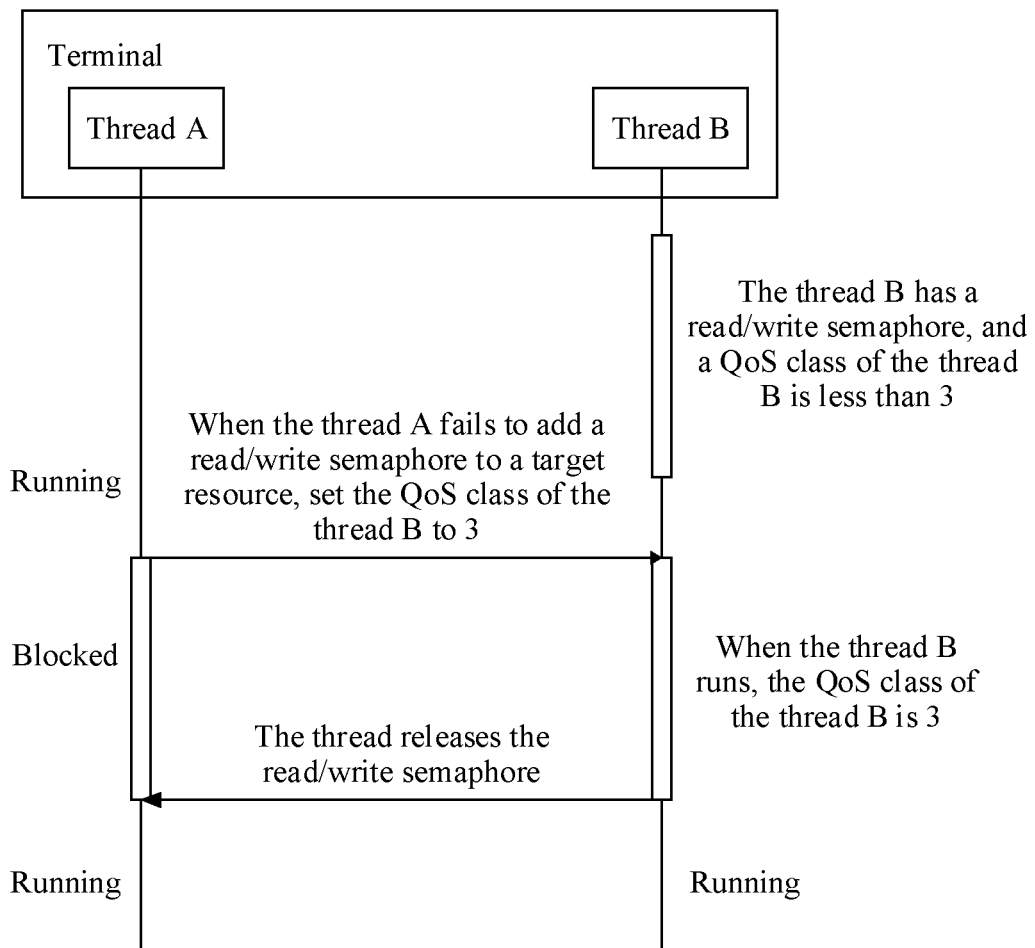
FIG. 10 is a flowchart of read/write semaphore synchronization according to an embodiment of this application.

FIG. 9 shows a procedure of mutex synchronization. In some embodiments, the terminal may further synchronize a read/write semaphore. FIG. 10 is a flowchart of read/write semaphore synchronization according to an embodiment of this application. It may be learned from FIG. 10 that a current QoS class of the thread A is 3. When the thread A fails to add a read/write semaphore to the target resource, the thread A may find the second thread using a rwsem function, and the second thread is the thread B. The thread A sets content of a QoS field in a thread control block of the thread B to content of a QoS field in a thread control block of the thread A, that is, sets a QoS class of the thread B to 3. The thread A queues in the waiting queue based on a QoS class of the thread A. When the thread B releases the lock, the thread B changes the content in the QoS field in the thread control block of the thread B to original content. For any lock resource having the read/write semaphore, a plurality of read requests or one write request may be simultaneously processed. Therefore, steps 506 and 507 may not be performed during processing of the read request.

Figure 11:
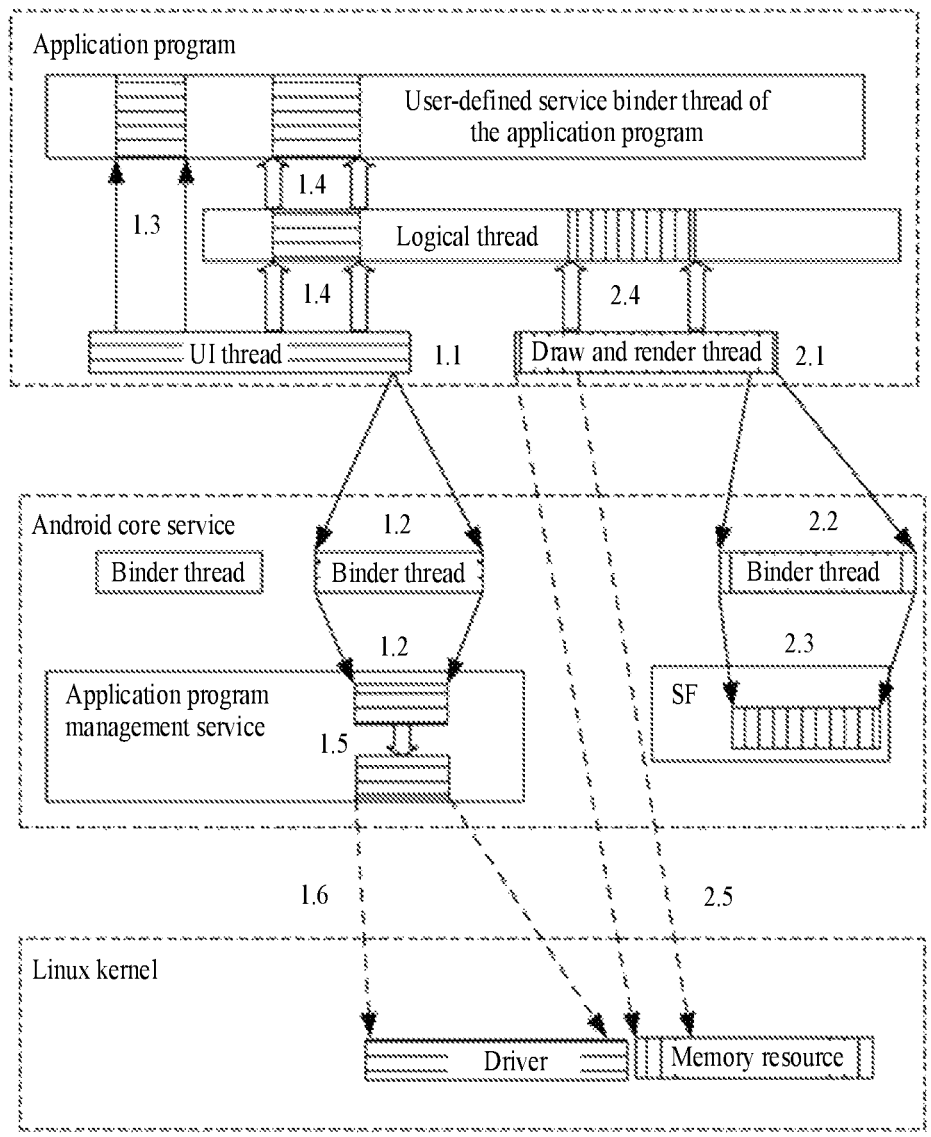
FIG. 11 is a schematic diagram of a task processing process based on an ANDROID system architecture according to an embodiment of this application.

To further describe a process shown in steps 501 and 507, refer to FIG. 11. FIG. 11 is a schematic diagram of a task processing process based on an ANDROID system architecture according to an embodiment of this application. FIG. 11 is used to describe a process of transferring a QoS class between different software layers of a system. As shown in FIG. 11, a UI thread transfers the QoS class to another thread in an application program using an IPC mechanism, an execution segment corresponding to the other thread is marked as the same as that of the UI thread, and when IPC dependency is removed, the QoS class of the thread is restored, and the mark of the execution segment is restored.

In this embodiment of this application, two processes in FIG. 11 are used to describe a process in which the terminal transfers the QoS class if the thread is called or the target resource is locked during execution of the thread. A process 1 is a process of transferring the QoS class when the QoS class is 2. A process 2 is a process of transferring the QoS class when the QoS class is 1. The process 1 includes the following steps 1.1 to 1.6.

Step 1.1: A UI thread of a foreground application program is a delay-sensitive thread, and the terminal configures a QoS class of the delay-sensitive thread as QoS=2, that is, configures the QoS class of the UI thread configure 2.

Step 1.2: The UI thread calls a thread using a synchronization request of an IPC in a binder system, where the called thread is a thread used in an execution process of the UI thread, for example, a binder thread in an ANDROID core service. After the binder thread is determined, the UI thread configures a QoS class of the binder thread as 2. When the binder thread needs to call a thread in an application management service in a calling process, the binder thread configures a QoS class of the called thread as 2. After calling of the thread by the binder thread ends, the thread is restored to the original QoS class. After calling of the binder thread by the UI thread ends, the binder thread is restored to the original QoS class.

Step 1.3: When the UI thread calls a user-defined service binder thread of the application program using the synchronization request of the IPC, the UI thread configures a QoS class of the user-defined service binder thread of the application program as 2, and after calling ends, the user-defined service binder thread of the application program is restored to the original QoS class.

Step 1.4: The UI thread may further call a logical thread, where the UI thread configures a QoS class of the logical thread as 2. In a process in which the logical thread is called, the logical thread needs to use a target resource indicated by a userspace mutex, but the user-defined service binder thread of the application program holds the userspace mutex, the logical thread configures the QoS class of the user-defined service binder thread of the application program as 2. After the user-defined service binder thread of the application program releases a lock, the logical thread locks the target resource, and the user-defined service binder thread of the application program is restored to the original QoS class.

Step 1.5: When the binder thread calls a thread in an application program management service, if the thread needs to use, in a process of being called, a target resource indicated by a JAVA lock, but another thread in the application program management service holds the JAVA lock, the called thread configures a QoS class of the other thread as 2. After the other thread releases the JAVA lock, the thread locks the target resource, and the other thread is restored to the original QoS class.

Step 1.6: When the thread in the application program management service calls a driver through system calling, if the driver is locked, the thread configures a QoS class of the thread that locks the driver as 2, and after the thread that locks the driver is released, the thread in the application program management service locks the driver and a thread that holds the lock is restored to the original QoS class.

The process 1 is described above, and the process 2 includes the following steps 2.1 to 2.5.

Step 2.1: The terminal configures a QoS class of a render thread as 1.

Step 2.2: When the render thread calls a binder thread in an ANDROID core service using a synchronization request of an IPC, the render thread configures a QoS class of the binder thread as 1, and after calling of the binder thread ends, the binder thread is restored to the original QoS class.

Step 2.3: When the binder thread calls a thread in an SF using the synchronization request of the IPC in a process of being called, the binder thread configures a QoS class of the thread in the SF as 1, and after calling of the thread in the SF ends, the thread in the SF is restored to the original QoS class.

Step 2.4: When the terminal needs to use, in a process of executing the render thread, a target resource indicated by a userspace mutex, a logical thread has locked the target resource, and the render thread configures a QoS class of the logical thread as 1. After the logical thread releases the lock, the render thread locks the target resource, and the logical thread is restored to the original QoS class.

Step 2.5: When the terminal calls a memory resource through system calling in a process of executing the render thread, if the memory resource is locked, the render thread configures, as 1, a QoS class of a thread that locks the memory resource, and after the thread that locks the memory resource releases the lock, the render thread locks the memory resource, and a thread that holds the lock is restored to the original QoS class.

Figure 12:
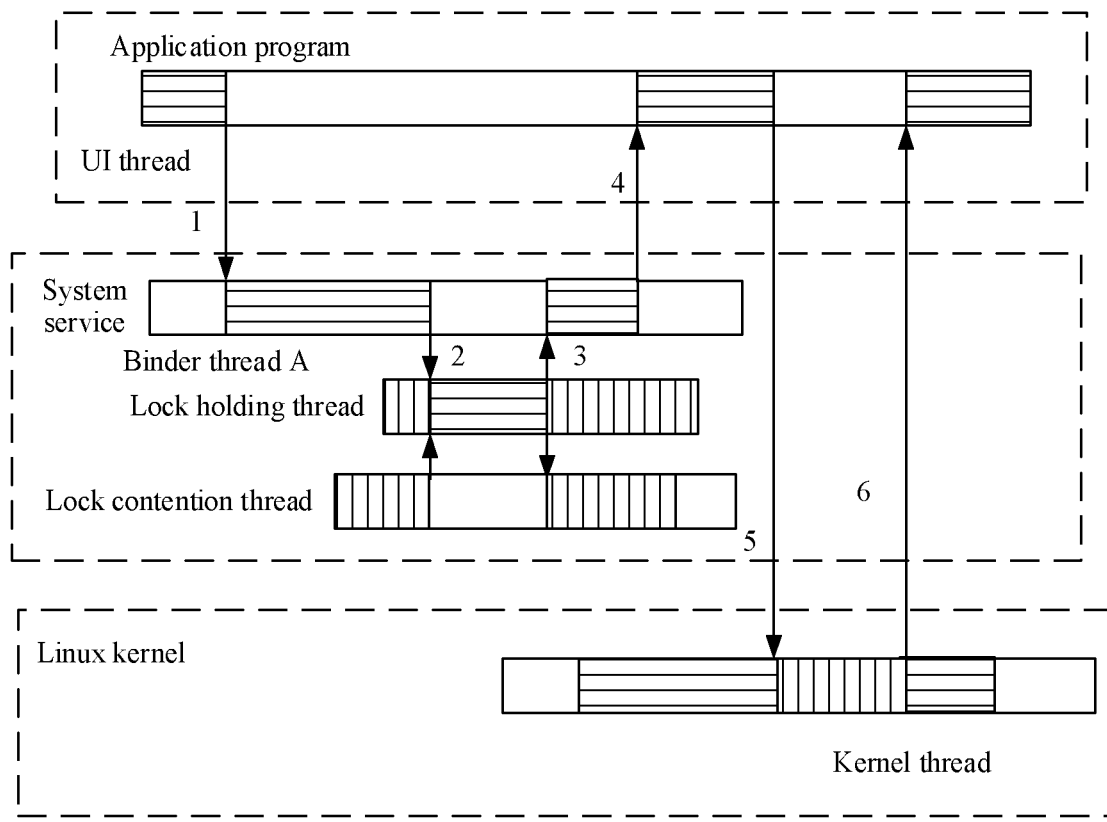
FIG. 12 is a flowchart of transferring a QoS class in a slip scenario according to an embodiment of this application.

To further describe a process shown in FIG. 8 to FIG. 10, refer to a flowchart of transferring a QoS class in a slip scenario shown in FIG. 12 according to an embodiment of this application. The process mainly includes the following steps 1 to 6.

Step 1: After the terminal receives a slip operation, the terminal receives a slip task, that is, switches an application program from background to foreground for running. When processing the slip task, the terminal sets a QoS class of a UI thread of the application program to 3. When the application program runs in the background, a QoS class is relatively low. That a QoS class of a thread of an application program running in the background is 2 means that, when the thread is dormant, a QoS class of the dormant thread is 2. A QoS class of a binder thread A is 2 when the binder thread A is dormant. When the UI thread performs synchronous calling using a binder to call a binder thread A in a system service, the UI thread updates a QoS class of the binder thread A from 2 to 3. Because the UI thread is calling the binder thread A in this case, the UI thread is in a formant state.

Step 2: When the binder thread A needs to use, in an execution process, a lock resource indicated by a userspace mutex, but a lock holding thread holds the userspace mutex, and a QoS class of the lock holding thread is 2, the binder thread A updates the QoS class of the thread holding the lock to 3, and the binder thread A is in the dormant state.

Step 3: After the lock holding thread releases the userspace mutex, the lock holding thread is restored to the original QoS class 2 and wakes up the binder thread A.

Another thread may also need to obtain the userspace mutex at a same time. For example, in a lock contention thread in FIG. 12, a QoS class of the lock contention thread is 2, but the userspace mutex is held by the lock holding thread. In this case, the lock contention thread is in a dormant state, and if the lock contention thread is woken up after the lock holding thread releases the lock, the original QoS class of the lock contention thread is 2.

Step 4: After obtaining the userspace mutex, the binder thread A continues to be executed based on the QoS class 3.

Step 5: In an execution process of the UI thread, a resource in a kernel needs to be called. If the resource has been locked by a kernel thread, and a QoS class of the kernel thread is 2, the UI thread updates the QoS class of the kernel thread to 3, and the UI thread is in a dormant state.

Step 6: After the kernel thread releases the lock, the kernel thread wakes up the UI thread, and the kernel thread is restored to the original QoS class 3.

508: When the first thread calls a third thread, the terminal adjusts the QoS class of the first thread and a QoS class of the third thread based on an amount of data that is of the first thread and that is cached in the third thread.

The third thread is any thread called by the first thread. The terminal may collect the amount of data that is of the first thread and that is cached in the third thread each time preset duration elapses, and the terminal adjusts the QoS class of the first thread and the QoS class of the third thread based on a relationship between the collected amount of data of the first thread and a data amount threshold. In a possible implementation, when the amount of data that is of the first thread and that is cached in the third thread is less than the data amount threshold, the terminal keeps the QoS class of the first thread and the QoS class of the third thread unchanged, and when the amount of data that is of the first thread and that is cached in the third thread is greater than or equal to the data amount threshold, the terminal lowers the QoS class of the first thread.

Figure 13:
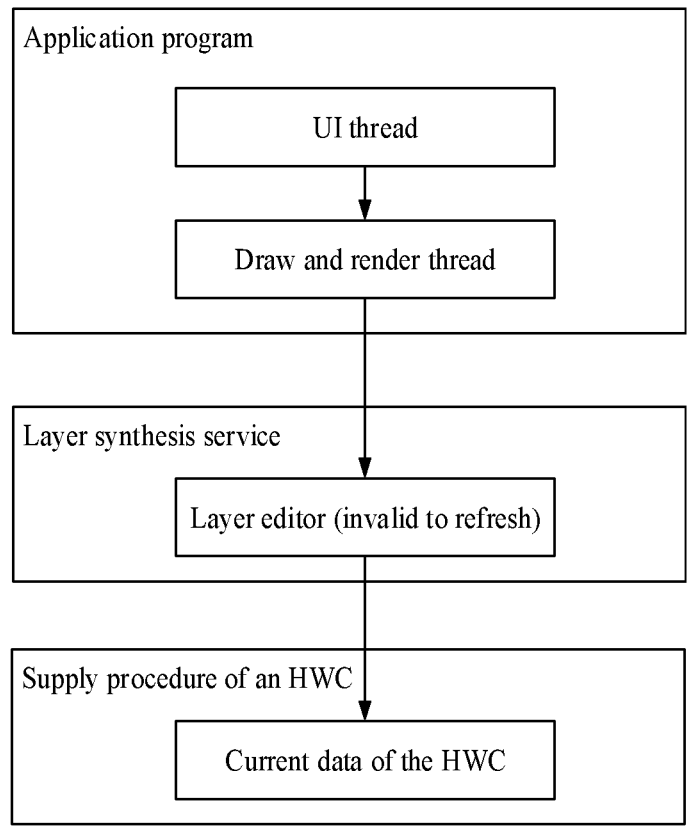
FIG. 13 is a schematic diagram of a pipeline-based dynamic QoS classification model in a rendering scenario according to an embodiment of this application.

To further describe step 508, refer to FIG. 13. FIG. 13 shows a model for dynamically adjusting a QoS class of a thread in a rendering scenario according to an embodiment of this application.

It may be learned from FIG. 13 that a draw and render model of a foreground application program in the system of the terminal is a pipeline model, a UI thread and a render thread of the application program are upstream producers and are used to produce rendering data, and the render thread sends produced rendering data to an SF using a binder. For the application program, the SF is a downstream consumer and is used to synthesize various layers. The SF sends data at a synthesis layer to an HWC. For the HWC, the SF is a producer, and the HWC is a consumer.

Before the terminal executes the UI thread and the render thread of the application program, the terminal has configured the QoS classes of the UI thread and the render thread. It is assumed that the QoS classes of the UI thread and the render thread are 2. In this case, when a data amount of rendering data cached in the SF is less than the data amount threshold, the terminal keeps a QoS class of the SF and the QoS class of the render thread unchanged, that is, equal to 2. When the data amount of the rendering data cached in the SF is greater than or equal to the data amount threshold, it indicates that consumption of the consumer SF is too slow or the render thread is produced too fast. In this case, the terminal degrades the QoS class of the render thread to 1.

When the terminal executes the first thread too fast, excessive resources are used by the first thread when the terminal executes the first thread, and excessive data resources are generated. Consequently, unnecessary power consumption is caused. When the terminal executes the first thread too slowly, the data resources generated by the first thread are insufficient for a lower-layer thread to use. However, the QoS class of the thread is dynamically adjusted in step 508 such that the terminal can execute the first thread at a most appropriate speed, thereby avoiding a case in which unnecessary power consumption is caused when the first thread uses a resource in the system, or a case in which the resource is insufficient for the lower-layer thread.

In a possible implementation, when the first thread calls the third thread, if the amount of data that is of the first thread and that is cached in the third thread is less than the data amount threshold, the terminal improves the QoS class of the first thread, and when the first thread calls the third thread, if the amount of data that is of the first thread and that is cached in the third thread is greater than or equal to the data amount threshold, the terminal improves the QoS class of the third thread.

When the amount of data that is of the first thread and that is cached in the third thread is less than the data amount threshold, the terminal improves the QoS class of the first thread such that the amount of data that is of the first thread and that is in the third thread reaches the data amount threshold. When the third thread is suddenly consumed excessively fast, a case in which the amount of data that is of the first thread and that is in the third thread cannot keep up with consumption progress can be avoided.

When the amount of data that is of the first thread and that is cached in the third thread is greater than or equal to the data amount threshold, the terminal improves the QoS class of the third thread such that a consumption speed of the amount of data that is of the first thread and that is cached in the third thread is accelerated, and data generated by the first thread can be prevented from being accumulated in the third thread.

It should be noted that, in a process of processing the task request, the terminal may continuously perform step 508, to adjust, at any time, a QoS class of each thread when processing the task request.

509: When the first thread fails to apply for a memory resource, and the QoS class of the first thread is higher than a second target class, the terminal allocates the memory resource to the first thread from a reserved memory resource.

The second target class may be a class with relatively high QoS. For example, the second target class is a class 2. The second target class is not limited in this embodiment of this application.

The reserved memory resource is a memory resource that is reserved in advance by the terminal and that is used for emergency use. In a possible implementation, when the terminal initializes the memory resource, the terminal sets some memory resources in the memory resource of the terminal as the reserved memory resource such that a thread with a relatively high QoS class can directly use the reserved memory resource.

When the terminal needs, in a process of executing the first thread, the memory resource to store data required or generated in the process of executing the first thread, the first thread applies to the terminal for the memory resource. When a memory provided for the thread in the terminal is used up, and when the QoS class of the first thread is greater than the second target class, the first thread fails to apply for the memory resource. In this case, the terminal may allocate the memory resource to the first thread from the reserved memory resource such that the first thread can use the allocated memory resource. This avoids a case in which the terminal can allocate the memory resource to the first thread from the released memory resource only after the first thread waits for the memory resource to be released, and improving efficiency of processing the first thread. Because the first thread is a thread with a relatively high QoS class, task processing efficiency can be improved.

According to the method provided in this embodiment of this application, a QoS class of a task is set, the QoS class is related to user perception, a priority of a thread executing the task is configured as the QoS class of the task, and the priority of the thread is used to indicate an execution sequence of the thread in the system. In this method, the execution sequence of the thread complies with the QoS class of the task. In this way, a task with a higher QoS class (that is, a task with higher user perception) is executed faster.

This avoids, to some extent, freezing caused by excessively long task processing time. In addition, a QoS class of a thread executed by the terminal when the terminal processes the task request is dynamically adjusted such that the terminal can execute the first thread at a most appropriate speed. This avoids unnecessary power consumption caused when the first thread uses a resource in the system, or a case in which the resource is insufficient for a lower-layer thread. In addition, when the first thread obtains the memory resource from the reserved memory resource, task processing efficiency can be improved.

Figure 14:
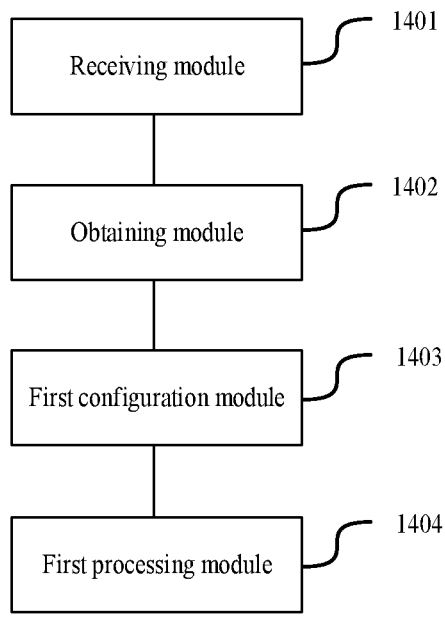
FIG. 14 is a structural apparatus diagram of a task processing apparatus according to an embodiment of this application.

FIG. 14 is a structural apparatus diagram of a task processing apparatus according to an embodiment of this application. The apparatus includes a receiving module 1401 configured to perform step 502, an obtaining module 1402 configured to perform step 503, a first configuration module 1403 configured to perform step 504, and a first processing module 1404 configured to perform step 505.

Optionally, the first processing module 1404 is configured to, before inserting the subtask into a subtask that is in a processing queue and whose QoS class is lower than the QoS class of the thread or that has no QoS class, process the subtask based on a sequence in the processing queue.

Optionally, the first processing module 1404 further includes a configuration unit configured to perform step 506, and a processing unit configured to perform step 507.

Optionally, the configuration unit is configured to perform steps 506A to 506C.

Optionally, the processing unit is configured to perform steps 507A and 507B.

Optionally, the apparatus further includes an adjustment module configured to perform step 508.

Optionally, the adjustment module is configured to when the first thread calls the third thread, if an amount of data that is of the first thread and that is cached in the third thread is less than a data amount threshold, keep the QoS class of the first thread and a QoS class of the third thread unchanged, and when the first thread calls the third thread, if the amount of data that is of the first thread and that is cached in the third thread is greater than or equal to the data amount threshold, lower the QoS class of the first thread.

Optionally, the adjustment module is configured to, when the first thread calls the third thread, if an amount of data that is of the first thread and that is cached in the third thread is less than a data amount threshold, improve the QoS class of the first thread, and when the first thread calls the third thread, if the amount of data that is of the first thread and that is cached in the third thread is greater than or equal to the data amount threshold, improve a QoS class of the third thread.

Optionally, the QoS class of the task is determined by a task feature of the task.

Optionally, the apparatus further includes a second configuration module configured to when the task is being processed, if the application program is switched from foreground running to background running, configure a QoS class of the thread corresponding to the task as a first target class.

Optionally, the first configuration module is configured to configure a QoS class field in a thread control block structure of the first thread as the QoS class of the task, where the thread control block structure is configured to store information about the thread.

Optionally, the apparatus further includes an allocation module configured to perform step 509.

Optionally, the apparatus further includes a corresponding module configured to enable different task requests to correspond to different task quality classes.

All the foregoing optional technical solutions may form an optional embodiment of the present disclosure using any combination. Details are not described herein.

It may be noted that when the task processing apparatus provided in the foregoing embodiment is performing task processing, division of the foregoing function modules is only taken as an example for illustration. In actual application, the foregoing functions may be allocated to different function modules and implemented based on a requirement, that is, an inner structure of the apparatus is divided into different function modules to implement all or some of the functions described above. In addition, the task processing apparatus provided in the foregoing embodiment belongs to a same concept as the embodiment of the task processing method. For a specific implementation process of the task processing apparatus, refer to the method embodiment. Details are not described herein again.

In addition, this application provides a computer program product (or a computer program), where the computer program product stores at least one instruction, and the instruction is loaded and executed by a processor to implement operations performed in the foregoing task processing method.

In conclusion, in the solution provided in this application, a QoS class related to a task is defined based on task importance, and the QoS class is set to a QoS class of a thread that implements the task such that execution efficiency of an important task is improved. Further, the QoS class of the thread is transferred between threads based on synchronous IPC calling (a mechanism such as binder or socket), lock dependency, and the like in a system such that QoS consistency of the threads on a thread dependency chain can be ensured, and inversion and loss are avoided. Further, QoS is reversely adjusted based on a currently drawn consumer model. This avoids power overheads caused by resource oversupply.

A person of ordinary skill in the art may understand that all or some of the steps of the foregoing embodiments may be implemented by hardware or a program instructing related hardware. The program may be stored in a computer-readable storage medium. The storage medium may include a read-only memory (ROM), a magnetic disk, or an optical disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method comprising:
receiving a task request requesting to process a task related to an application program;
obtaining a first quality of service (QoS) class corresponding to the task based on the task request;
configuring a second QoS class of a first thread as the first QoS class when processing a first subtask corresponding to the task request using the first thread;
processing a second subtask corresponding to the first thread based on a processing sequence corresponding to the second QoS class and based on a sequence in a processing queue; and
allocating a memory resource to the first thread from a reserved memory resource when the first thread fails to apply for the memory resource and when the second QoS class is higher than a second target class.

2. The method of claim 1, further comprising inserting the second subtask into a third subtask in the processing queue, wherein a third QoS class of the third subtask is either lower than the second QoS class or does not have a QoS class.

3. The method of claim 1, further comprising:
configuring a fourth QoS class of a second thread as the second QoS class when a target resource of the second subtask is locked, wherein the second thread locks the target resource; and
processing the second subtask based on the target resource when the second thread releases a lock on the target resource.

4. The method of claim 3, further comprising:
locking the target resource when executing the second subtask;
determining the second thread when the target resource fails to be locked; and
updating the fourth QoS class to the second QoS class when the fourth QoS class is lower than the second QoS class.

5. The method of claim 3, wherein after releasing the lock, the method further comprises:
locking the target resource based on a sequence in a waiting queue of the target resource, wherein the waiting queue stores a third thread to be used for processing the target resource;
restoring an original QoS class of the second thread; and
processing the second subtask based on the target resource after the target resource is locked.

6. The method of claim 1, wherein the first thread calls a fourth thread, and wherein the method further comprises adjusting the second QoS class and a fifth QoS class of the fourth thread based on an amount of data of the first thread that is cached in the fourth thread.

7. The method of claim 6, further comprising:
maintaining the second QoS class and the fifth QoS class when the first thread calls the fourth thread and when the amount of data is less than a data amount threshold; and
lowering the second QoS class when the first thread calls the fourth thread and when the amount of data is greater than or equal to the data amount threshold.

8. The method of claim 6, further comprising:
raising the second QoS class when the first thread calls the fourth thread and when the amount of data is less than a data amount threshold; and
raising the fifth QoS class when the first thread calls the fourth thread and when the amount of data is greater than or equal to the data amount threshold.

9. The method of claim 1, further comprising:
switching the application program from foreground running to background running; and
configuring a sixth QoS class of a fifth thread corresponding to the task as a first target class when processing the task.

10. A terminal comprising:
a memory configured to store instructions; and
a processor coupled the memory, wherein the instructions cause the processor to be configured to:
receive a task request requesting to process a task related to an application program;
obtain a first quality of service (QoS) class corresponding to the task based on the task request;
configure a second QoS class of a first thread as the first QoS class when processing a first subtask corresponding to the task request using the first thread, wherein the first thread calls a fourth thread, and wherein the instructions further cause the processor to be configured to adjust the second QoS class and a fifth QoS class of the fourth thread based on an amount of data of the first thread that is cached in the fourth thread; and
process a second subtask corresponding to the first thread based on a processing sequence corresponding to the second QoS class and based on a sequence in a processing queue.

11. The terminal of claim 10, wherein the instructions further cause the processor to be configured to insert the second subtask into a third subtask in the processing queue, wherein a third QoS class of the third subtask is either lower than the second QoS class or does not comprise a QoS class.

12. The terminal of claim 10, wherein the instructions further cause the processor to be configured to:
configure a fourth QoS class of a second thread as the second QoS class when a target resource of the second subtask is locked, wherein the second thread locks the target resource; and
process the second subtask based on the target resource when the second thread releases a lock on the target resource.

13. The terminal of claim 12, wherein the instructions further cause the processor to be configured to:
lock the target resource when executing the second subtask;
determine the second thread when the target resource fails to be locked; and
update the fourth QoS class to the second QoS class when the fourth QoS class is lower than the second QoS class.

14. The terminal of claim 12, wherein after releasing the lock, the instructions further cause the processor to be configured to:
lock the target resource based on a sequence in a waiting queue of the target resource, wherein the waiting queue stores a third thread to be used for processing the target resource;
restore an original QoS class of the second thread; and
process the second subtask based on the target resource after the target resource is locked.

15. The terminal of claim 10, wherein the instructions further cause the processor to be configured to:
maintain the second QoS class and the fifth QoS class when the first thread calls the fourth thread and when the amount of data is less than a data amount threshold; and
lower the second QoS class when the first thread calls the fourth thread and when the amount of data is greater than or equal to the data amount threshold.

16. The terminal of claim 10, wherein the instructions further cause the processor to be configured to:
raise the second QoS class when the first thread calls the fourth thread and when the amount of data is less than a data amount threshold; and
raise the fifth QoS class when the first thread calls the fourth thread and when the amount of data is greater than or equal to the data amount threshold.

17. The terminal of claim 10, wherein the instructions further cause the processor to be configured to:
switch the application program from foreground running to background running;
configure a sixth QoS class of a fifth thread corresponding to the task as a first target class when processing the task; and
allocate a memory resource to the first thread from a reserved memory resource when the first thread fails to apply for the memory resource and when the second QoS class is higher than a second target class.

18. A computer program product comprising computer-executable instructions for storage on a non-transitory computer-readable medium that, when executed by a processor, cause an apparatus to:
receive a task request requesting to process a task related to an application program;
obtain a first quality of service (QoS) class corresponding to the task based on the task request;
configure a second QoS class of a first thread as the first QoS class when processing a first subtask corresponding to the task request using the first thread;
process a second subtask corresponding to the first thread based on a processing sequence corresponding to the second QoS class and based on a sequence in a processing queue; and
switching the application program from foreground running to background running; and
configuring a sixth QoS class of a fifth thread corresponding to the task as a first target class when processing the task.

19. The computer program product of claim 18, wherein the instructions further cause the apparatus to configure the first thread to call a fourth thread, and to adjust the second QoS class and a fifth QoS class of the fourth thread based on an amount of data of the first thread that is cached in the fourth thread.

20. The computer program product of claim 18, wherein the instructions further cause the processor to be configured to allocate a memory resource to the first thread from a reserved memory resource when the first thread fails to apply for the memory resource and when the second QoS class is higher than a second target class.

* * * * *